United States Patent
Sugaya

(10) Patent No.: US 7,567,826 B2
(45) Date of Patent: Jul. 28, 2009

(54) WIRELESS COMMUNICATION SYSTEM AND WIRELESS COMMUNICATION APPARATUS

(75) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 555 days.

(21) Appl. No.: 11/252,014

(22) Filed: Oct. 17, 2005

(65) Prior Publication Data

US 2007/0053315 A1  Mar. 8, 2007

(30) Foreign Application Priority Data

Oct. 18, 2004  (JP) .............................. 2004-303474
Apr. 18, 2005  (JP) .............................. 2005-119348
Sep. 13, 2005  (JP) .............................. 2005-265707

(51) Int. Cl.
*H04M 1/00* (2006.01)

(52) U.S. Cl. ................. 455/574; 455/552.1; 455/343.2; 455/550.1

(58) Field of Classification Search .............. 455/550.1, 455/574, 552.1, 572, 450, 452.1, 502, 3.01, 455/509, 343.1–4, 41.2; 370/318, 338, 252

See application file for complete search history.

(56) References Cited

U.S. PATENT DOCUMENTS 7,277,737 B1 * 10/2007 Vollmer et al. .............. 455/574
2004/0176148 A1 * 9/2004 Morimoto .................... 455/574
2005/0054372 A1 * 3/2005 Tsuda et al. ............. 455/550.1
2005/0099943 A1 * 5/2005 Naghian et al. ............. 370/229

FOREIGN PATENT DOCUMENTS

JP         2002-64501 A    2/2002
WO    WO-2004/071020 A1   8/2004

* cited by examiner

*Primary Examiner*—John J Lee
(74) *Attorney, Agent, or Firm*—Lerner, David, Littenberg, Krumholz & Mentlik, LLP

(57) ABSTRACT

A wireless communication system includes plural wireless communication apparatuses which form an ad-hoc network. In the system, an operating state of each superframe of each wireless communication apparatus is determined from three operating states: an active state in which beacon signal transmission/reception and data transmission/reception are performed as necessary; a sleep state in which beacon signal transmission/reception and data transmission/reception are not performed; and a pre-receive state in which a beacon signal is received and afterward beacon signal transmission and data transmission are not performed.

16 Claims, 28 Drawing Sheets

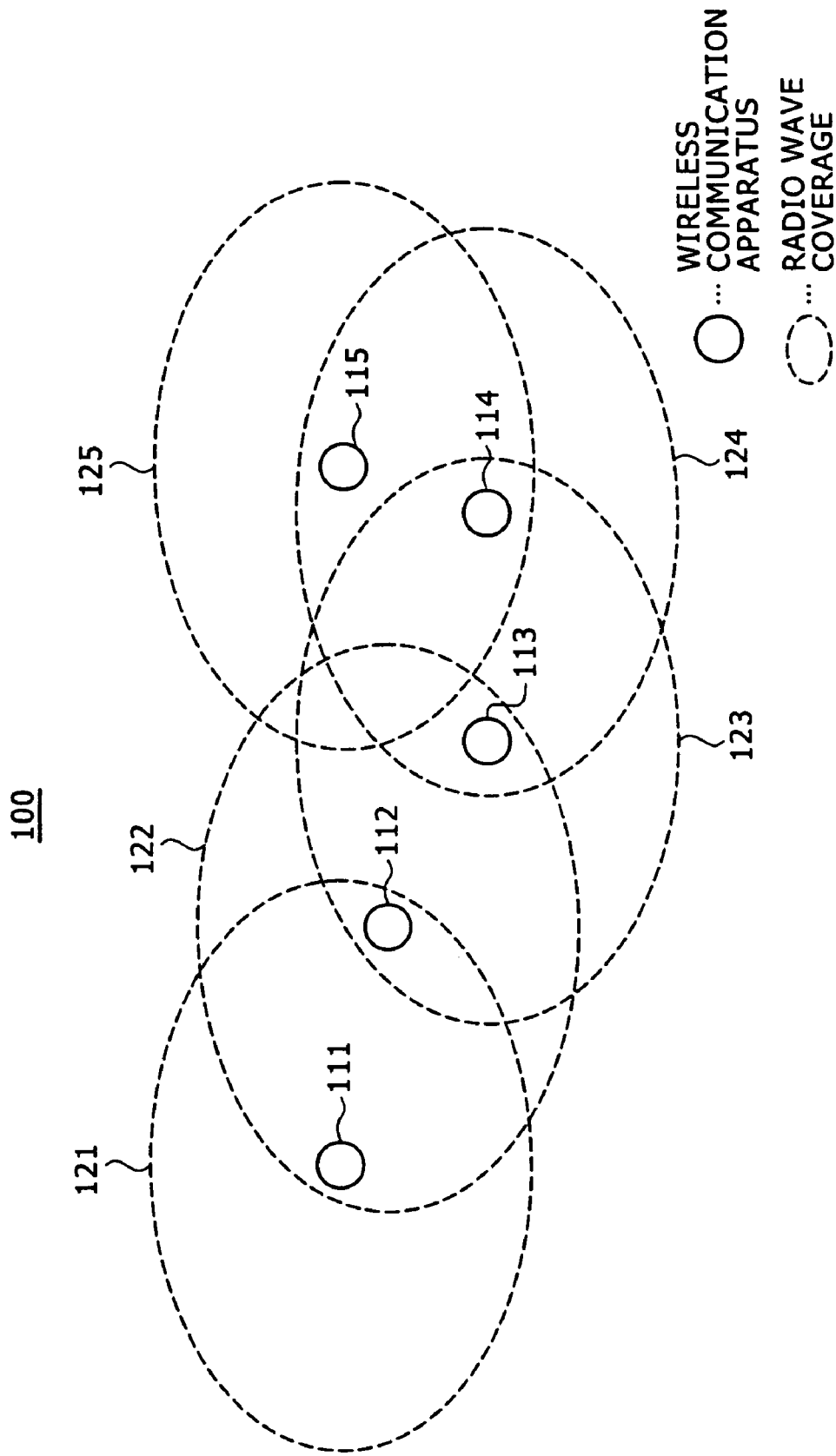

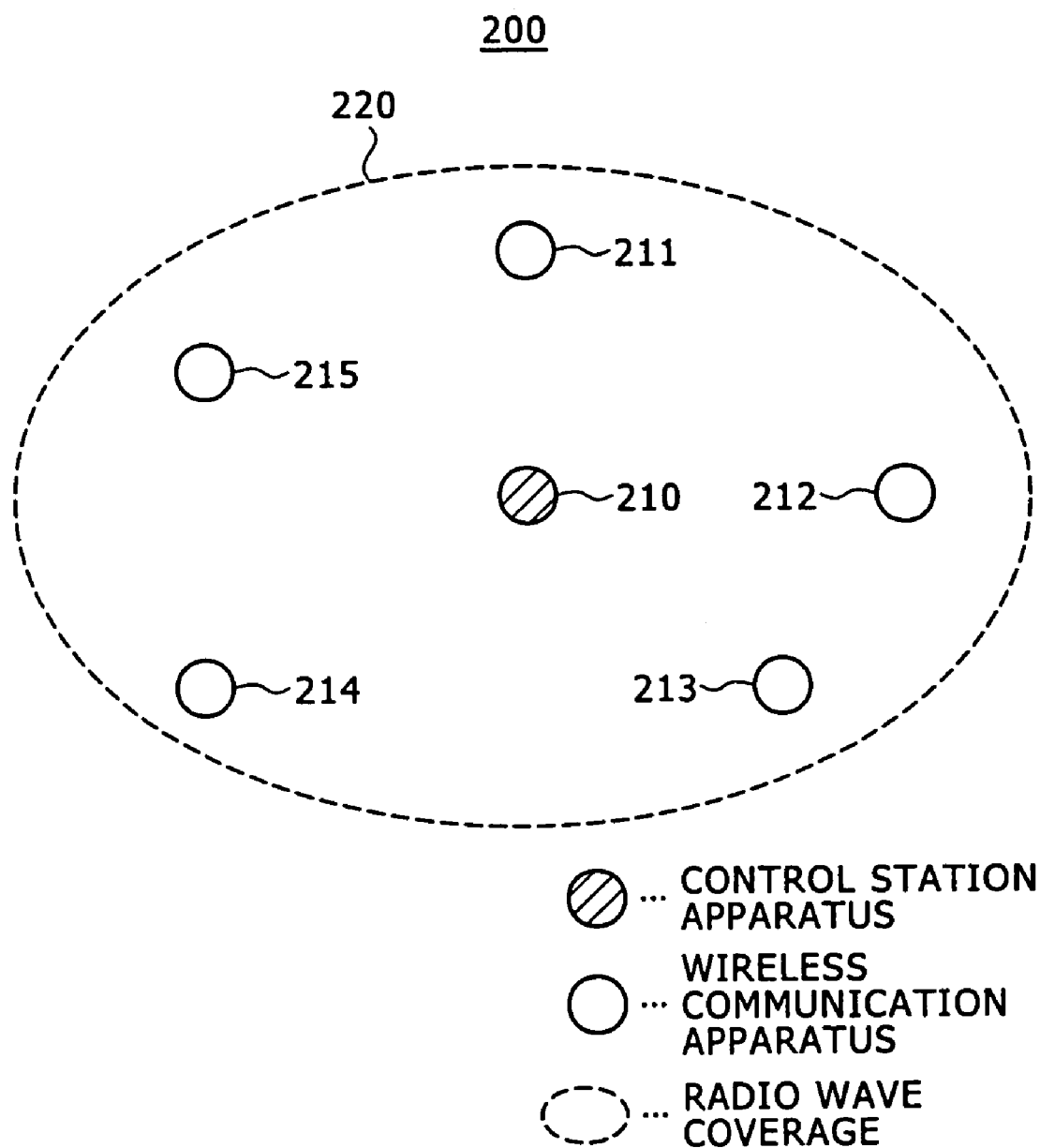

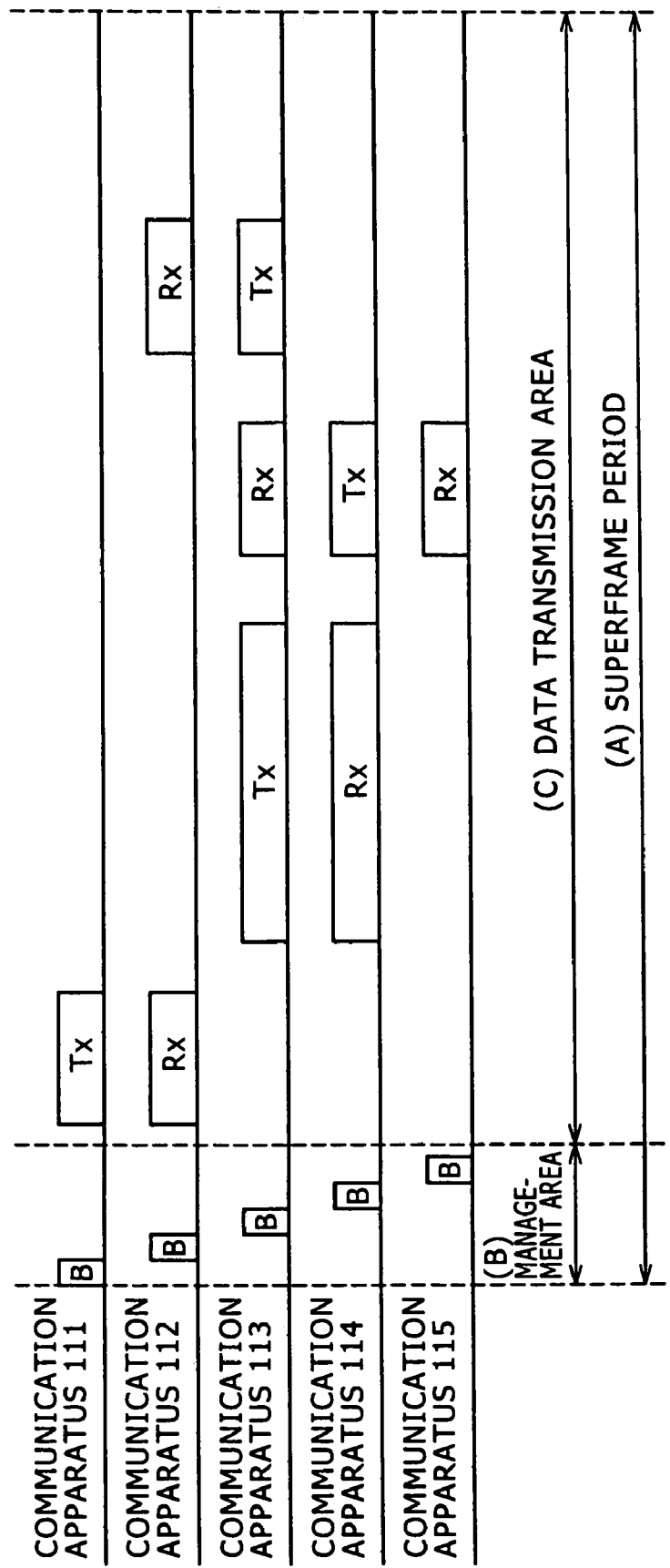

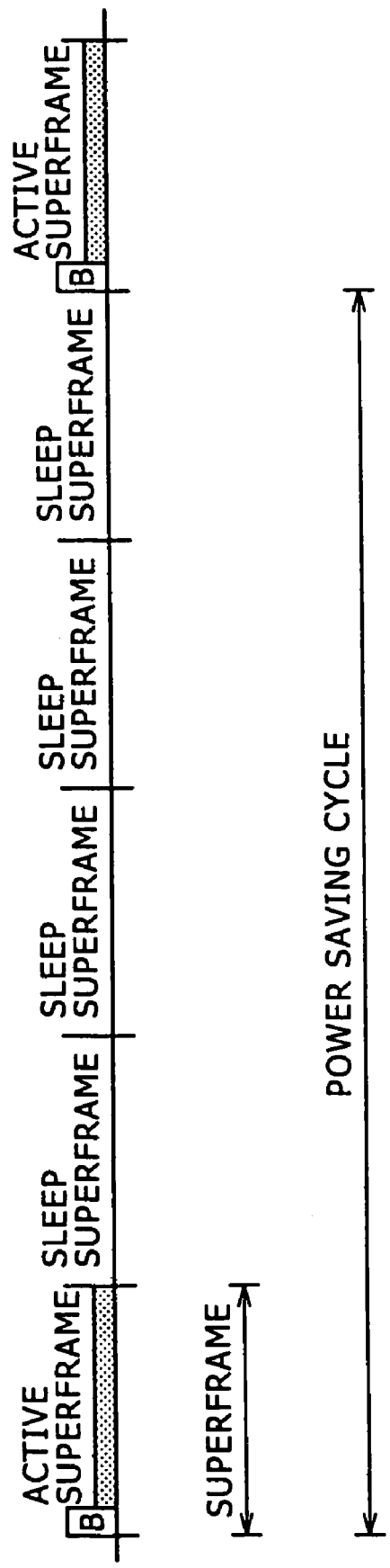
FIG. 4A
FIG. 4B

FIG. 15

| 1 Octet | 1 Octet | 1 Octet | K Octets | 2 Octets | 2 Octets | ... | 2 Octets |
|---|---|---|---|---|---|---|---|
| ELEMENT ID | INFORMATION LENGTH | BP LENGTH | BEACON SLOT INFORMATION BITMAP | ADDRESS 1 | ADDRESS 2 | ... | ADDRESS N |
| DESCRIBE IDENTIFIER SPECIFIC TO THE INFORMATION ELEMENT | INFORMATION LENGTH OF THE FRAME | FARTHEST ADJACENT SLOT +2 | 00:UNOCCUPIED 01:TEMPORARY USE/DETECTION ONLY 10:SLEEP STATE ASSIGNED 11:OCCUPIED | DESCRIBE ADDRESSES OF BEACONS SUCCESSIVELY REGARDING PARTS OTHER THAN UNOCCUPIED (:00) IN THE LEFT BITMAP | | | |
| 701 | 702 | 703 | 704 | 705 | | | |

BEACON SLOT USE STATUS INFORMATION ELEMENT

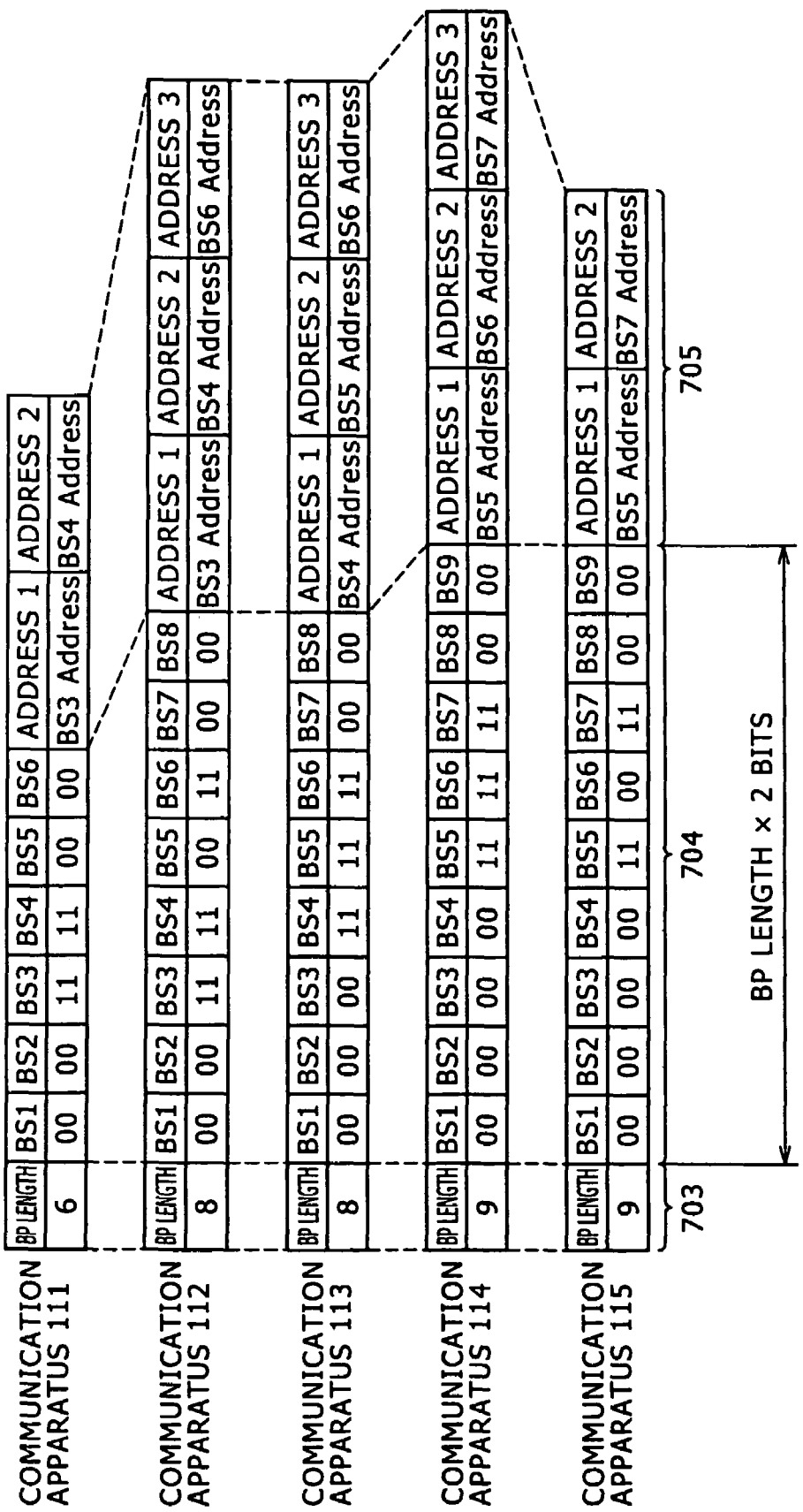

| HIBERNATION MODE INFORMATION ELEMENT | | | |
|---|---|---|---|
| 1 Octet | 1 Octet | 1 Octet | 1 Octet |
| ELEMENT ID | INFORMATION LENGTH | COUNTDOWN VALUE | HIBERNATION DURATION |
| 711 | 712 | 713 | 714 |

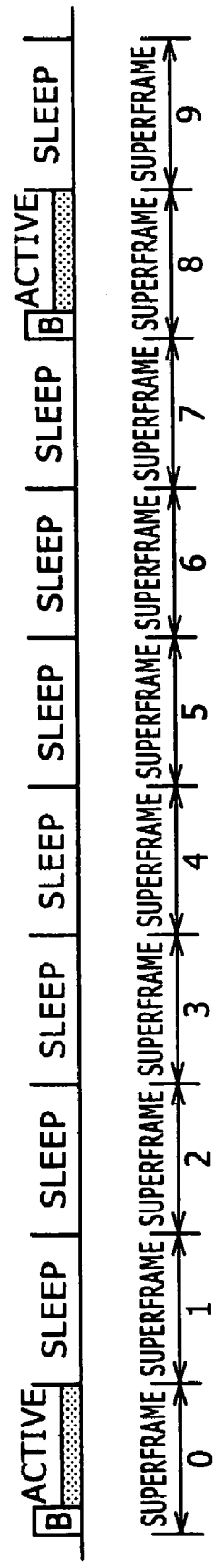
FIG. 20A
FIG. 20B

FIG. 24

| ELEMENT IDENTIFIER | INFORMATION LENGTH | HIBERNATION COUNTDOWN | HIBERNATION SLEEP DURATION | HIBERNATION ACTIVE DURATION |
|---|---|---|---|---|
| 1 Octet | 1 Octet | 1 Octet | 1 Octet | 1 Octet |
| 1071 | 1072 | 1073 | 1074 | 1075 |

HIBERNATION MODE INFORMATION ELEMENT

WIRELESS COMMUNICATION SYSTEM AND WIRELESS COMMUNICATION APPARATUS

CROSS-REFERENCE TO RELATED APPLICATIONS

The present invention claims priority from Japanese Patent Application Nos. 2004-303474 filed Oct. 18, 2004, 2005-119348 filed Apr. 18, 2005, and 2005-265707 filed Sep. 13, 2005, the disclosures of which are hereby incorporated by reference herein.

BACKGROUND OF THE INVENTION

The present invention relates to a wireless communication system and a wireless communication apparatus, and more particularly, to a wireless communication system and a wireless communication apparatus that are characterized in a method of returning to an active state from a sleep state in an ad-hoc network.

At present, a standard specification to achieve a high-speed wireless personal area network (PAN) is defined in IEEE802. 15. 3 and is being recognized as one of the high-speed wireless communication systems. For example, International Publication WO 2004/071020 pamphlet defines a method by which one activation is carried out in a plurality of superframe periods as a power-save mode, and a wireless communication apparatus (terminal) other than a control station (PNC) switches back and forth between two operating states of a sleep state and an active state as necessary, thereby enabling low power consumption operation.

That is, there is defined a method by which the wireless communication apparatus that operates with low power consumption continues the sleep state over several superframes and then transitions to the active state only for one superframe, exchanging data with the control station and other wireless communication apparatuses in this timing. That is, since the control station that does not enter the sleep state receives beacon signals at regular time intervals, the adjacent wireless communication apparatuses (terminals) carry out communication in synchronization with the beacon signals.

According to Japanese Patent Application Laid-Open No. 2002-64501 by the assignee of the invention, there is disclosed a technology that a wireless communication apparatus in a power-save mode informs the control station about the presence of other wireless communication apparatuses existing in the network. In the technology, there is shown a wireless communication method of informing the control station during a transmission activation period about the operating status of terminal stations that have been recognized during a reception activation period by setting two periods of a first period for reception and a second period for transmission.

Further, in recent years, there has been developed a method that adjacent wireless communication apparatuses operate in an autonomous distributed manner without a control station and constitute an ad-hoc network. Advantageously, such a network structure negates the need for the process of selecting a control station and simplifies the processing of entry into the network. In this case, due to no control station, it is difficult to define the power-save mode defined in the above-mentioned IEEE802. 15. 3; however, similar low power consumption operation is defined as a "hibernation mode."

In the ad-hoc network, there has been a problem that though each wireless communication apparatus transmits a beacon signal, a wireless communication apparatus cannot accurately grasp its own beacon transmission position with reference to the beacon signals of other wireless communication apparatuses, depending on the beacon transmission position of the wireless communication apparatus in the hibernation mode.

Further, according to a transmission control method described in the Japanese Patent Application Laid-Open No. 2002-64501, a wireless communication apparatus in the power-save mode (also referred to as a sleep mode) requires setting the two periods of the first period for reception and the second period for transmission; therefore, the wireless communication apparatus cannot operate without an instruction or a request for the settings from the control station.

In a past communication system having a control station, a terminal station in the power-save mode has achieved synchronization with signals from the control station that always transmits signals. However, in the ad-hoc network, there has been a problem that each communication station cannot enter the power-save mode because due to no control station, it cannot specify which communication station to achieve synchronization with.

Further, in the ad-hoc network, there has been a problem that since each synchronization between adjacent wireless communication apparatuses is achieved for communication, a wireless communication apparatus cannot specify transmission timing of its own beacon signal unless the wireless communication apparatus receives specified beacon signals from adjacent wireless communication apparatuses.

Further, there has been a problem that the wireless communication apparatus cannot grasp the transmission position of its own beacon signal unless the wireless communication apparatus receives beacon signals from adjacent wireless communication apparatuses prior to the own transmission beacon signal position.

Furthermore, there has been a problem that in a wireless communication system in which the transmission position of a beacon signal is arranged at the head of a superframe period, the wireless communication apparatus cannot grasp the presence of adjacent wireless communication apparatuses, immediately after the wireless communication apparatus in the hibernation mode transitions to an active state.

Furthermore, there has been a problem that since the wireless communication apparatus has not received beacon signals from adjacent wireless communication apparatuses immediately after the wireless communication apparatus transitions from a sleep state to an active state, the wireless communication apparatus cannot exchange the presence and operating states of adjacent wireless communication apparatuses, using a transmission beacon signal.

The present invention has been made in view of the foregoing problems which the past wireless communication system and wireless communication apparatus have, and it is desirable to provide new and improved wireless communication system and wireless communication apparatus capable of specifying a transmission position of an accurate beacon signal at the time of transitioning from the sleep state to the active state in the ad-hoc network.

Furthermore, it is desirable to provide new and improved wireless communication system and wireless communication apparatus capable of transmitting an accurate beacon signal including the presence of adjacent wireless communication apparatuses when the wireless communication apparatus in the hibernation mode transitions from the sleep state to the active state.

SUMMARY OF THE INVENTION

According to an embodiment of the present invention, there is provided a wireless communication system including a plurality of wireless communication apparatuses forming an ad-hoc network, each wireless communication apparatus having a superframe, wherein an operating state of each superframe of each wireless communication apparatus is determined from three operating states which are an active state in which beacon signal transmission/reception and data transmission/reception are performed as necessary, a sleep state in which beacon signal transmission/reception and data transmission/reception are not performed, and a pre-receive state in which a beacon signal is received and afterward beacon signal transmission and data transmission are not performed. Further, it is also possible to define a pre-receive state in which a beacon signal is received and afterward beacon signal transmission/reception and data transmission/reception are not performed.

Alternatively, the wireless communication apparatus transitions from the sleep state to the pre-receive state in a predetermined superframe period and receives a beacon signal from an adjacent wireless communication apparatus, and at the time of transitioning to the active state according to information contained in the beacon signal, according to the reception timing of the beacon signal the wireless communication apparatus sets transmission timing of a beacon signal (achieve synchronization).

With the wireless communication system as described, in the ad-hoc network, the wireless communication apparatus transitions from the sleep state to the pre-receive state in a predetermined superframe period and thereby can receive a beacon signal from an adjacent wireless communication apparatus (such an operating mode is referred to as a "low power consumption mode" or a "hibernation mode"). Further, at the time of transitioning from the sleep state to the active state according to information contained in the beacon signal, the wireless communication apparatus receives a beacon signal from an adjacent wireless communication apparatus beforehand and thereby can grasp the transmission timing of its own beacon signal. Further, at the time of transitioning from the sleep state to the active state, by receiving a beacon signal from an adjacent wireless communication apparatus, the wireless communication apparatus can grasp the presence of the adjacent wireless communication apparatus and the operating status of the adjacent wireless communication apparatus and describe accurate information in its own beacon signal in the active state.

Alternatively, in the above-described wireless communication system, in the case where the beacon signal received by the wireless communication apparatus in the pre-receive state contains information concerning an activation request addressed thereto, the wireless communication apparatus transitions to the active state. Thus, at the time of transitioning from the sleep state to the active state, the wireless communication apparatus can be activated with sufficient time. In general, it is necessary to have sufficient time (e.g., several hundreds of milliseconds) in order to activate a software section in the process of transition from the sleep state to the active state. In the past, no data can be sent during a time interval between beacon signals such as about 40 milliseconds to 60 milliseconds, thereby causing degradation of system quality. According an embodiment of the invention, there is defined a pre-receive state in which the wireless communication apparatus receives a beacon signal but does not perform beacon signal transmission and data transmission afterward. Thus, the wireless communication apparatus in the pre-receive state can activate the software section while essentially keeping the hardware section in the sleep state.

Alternatively, at the time of transitioning to the active state, the wireless communication apparatus grasps a state of another wireless communication apparatus existing in an adjacent area from the beacon signal received in the pre-receive state and announces its own transmission beacon information about a transition to the active state. Thus, information contained in the beacon signal received in the pre-receive state can be reflected in information contained in a beacon signal that the wireless communication apparatus transmits in the next superframe.

Alternatively, each wireless communication apparatus constituting the ad-hoc network adds information concerning the presence of a wireless communication apparatus in a low power consumption mode out of adjacent wireless communication apparatuses to a beacon signal and announces it. The low power consumption mode refers to the mode in which the wireless communication apparatus in the sleep state transitions to the pre-receive state or the active state in a predetermined superframe period. With the structure as described, even if there exists a wireless communication apparatus in the low power consumption mode, a collision of beacon signals can be prevented.

Furthermore, the same manner is applied in the case of a wireless communication apparatus that newly joins the ad-hoc network. That is, a wireless communication apparatus that newly joins the ad-hoc network may receive the beacon signal to which the information concerning the presence of the wireless communication apparatus in the low power consumption mode is added and determine to use a beacon slot other than the beacon slot that the wireless communication apparatus in the low power consumption mode has used, as a beacon slot that the newly joining wireless communication apparatus transmits. The newly joining wireless communication apparatus can determine a beacon slot that it transmits, avoiding the beacon slot that the wireless communication apparatus in the low power consumption mode has used.

Furthermore, the same manner is applied in the case where a wireless communication apparatus constituting the ad-hoc network changes a position of a beacon slot that the wireless communication apparatus transmits. That is, in the case where a wireless communication apparatus constituting the ad-hoc network changes a position of a beacon slot that the wireless communication apparatus transmits, the wireless communication apparatus may receive the beacon signal to which the information concerning the presence of another wireless communication apparatus in the low power consumption mode is added and determine to use a beacon slot other than the beacon slot that the another wireless communication apparatus in the low power consumption mode has used, as the beacon slot that the wireless communication apparatus transmits.

According to another embodiment of the present invention, there is provided a wireless communication apparatus connectable to an ad-hoc network. The wireless communication apparatus includes a superframe, and an operating state of each superframe is determined from three operating states which are an active state in which beacon signal transmission/reception and data transmission/reception are performed as necessary, a sleep state in which beacon signal transmission/reception and data transmission/reception are not performed, and a pre-receive state in which a beacon signal is received and afterward beacon signal transmission and data transmission are not performed. Further, it is also possible to define a pre-receive state in which a beacon signal is received and afterward beacon signal transmission/reception and data transmission/reception are not performed.

Alternatively, the wireless communication apparatus transitions from the sleep state to the pre-receive state in a predetermined superframe period and receives a beacon signal from an adjacent wireless communication-apparatus, and at the time of transitioning to the active state according to information contained in the beacon signal, according to the beacon signal the wireless communication apparatus sets transmission timing of its own beacon signal (achieve synchronization).

With the wireless communication apparatus as described, the wireless communication apparatus can transition to the pre-receive state in a predetermined superframe period and receive a beacon signal from an adjacent wireless communication apparatus (such an operating mode is referred to as a "low power consumption mode" or a "hibernation mode"). Further, at the time of transitioning from the sleep state to the active state according to information contained in the beacon signal, the wireless communication apparatus can receive a beacon signal from an adjacent wireless communication apparatus beforehand and grasp the transmission timing of its own beacon signal. Further, at the time of transitioning from the sleep state to the active state, by receiving a beacon signal from an adjacent wireless communication apparatus, the wireless communication apparatus can grasp the presence of the adjacent wireless communication apparatus and the operating status of the adjacent wireless communication apparatus and describe accurate information in its own beacon signal in the active state.

Alternatively, in the above-described wireless communication apparatus, in the case where the beacon signal received by the wireless communication apparatus in the pre-receive state contains information concerning an activation request addressed thereto, the wireless communication apparatus transitions to the active state. Thus, at the time of transitioning from the sleep state to the active state, the wireless communication apparatus can be activated with sufficient time. In general, it is necessary to have sufficient time (e.g., several hundreds of milliseconds) in order to activate a software section in the process of transition from the sleep state to the active state. In the past, no data can be sent during a time interval between beacon signals such as about 40 milliseconds to 60 milliseconds, thereby causing degradation of system quality. According an embodiment of the invention, there is defined a pre-receive state in which the wireless communication apparatus receives a beacon signal but does not perform beacon signal transmission and data transmission afterward. Thus, the wireless communication apparatus in the pre-receive state can activate the software section while essentially keeping the hardware section in the sleep state.

Alternatively, at the time of transitioning to the active state, the wireless communication apparatus grasps a state of another wireless communication apparatus existing in an adjacent area from the beacon signal received in the pre-receive state and announces its own transmission beacon information about a transition to the active state. Thus, information contained in the beacon signal received in the pre-receive state can be reflected in information contained in a beacon signal that the wireless communication apparatus transmits in the next superframe.

Alternatively, the wireless communication apparatus includes a device configured to detect the presence of a wireless communication apparatus in a low power consumption mode out of adjacent wireless communication apparatuses, and a device configured to add information concerning the presence of the wireless communication apparatus in the low power consumption mode to a beacon signal. The low power consumption mode refers to the mode in which the wireless communication apparatus in the sleep state transitions to the pre-receive state or the active state in a predetermined superframe period. With the structure as described, even if there exists a wireless communication apparatus in the low power consumption mode, a collision of beacon signals can be prevented.

Furthermore, the same manner is applied in the case where the wireless communication apparatus changes a position of a beacon slot that the wireless communication apparatus transmits. That is, in the case where the wireless communication apparatus changes a position of a beacon slot that the wireless communication apparatus transmits, the wireless communication apparatus may receive the beacon signal to which the information concerning the presence of another wireless communication apparatus in the low power consumption mode is added and determine to use a beacon slot other than the beacon slot that the another wireless communication apparatus in the low power consumption mode has used, as the beacon slot that the wireless communication apparatus transmits.

Alternatively, the wireless communication apparatus sets a low power consumption mode (hibernation mode) of transitioning periodically between the sleep state over a plurality of superframes and the active state over a plurality of superframes.

Alternatively, the wireless communication apparatus transitions to the pre-receive state at the time of transitioning from the sleep state to the active state, and at the time of having transitioned to the pre-receive state, the wireless communication apparatus receives a beacon signal and adjusts a superframe period with an adjacent wireless communication apparatus.

Alternatively, the wireless communication apparatus communicates with an adjacent wireless communication apparatus operating in the low power consumption mode (hibernation mode), and in the case of detecting that the adjacent wireless communication apparatus is in the pre-receive state, the wireless communication apparatus describes a request to the adjacent wireless communication apparatus in a beacon signal and transmits the beacon signal prior to a transition to the active state. On the contrary, in the pre-receive state, the wireless communication apparatus receives a beacon signal from an adjacent wireless communication apparatus, and in the case of detecting a request addressed thereto in the received beacon signal, the wireless communication apparatus transmits a response to the request with a first beacon signal after a transition to the active state.

According to another embodiment of the present invention, there is provided a wireless communication apparatus connectable to an ad-hoc network. The wireless communication apparatus includes a superframe, and an operating mode setting device (e.g., an operating mode setting unit 808 described later) configured to set an operating mode allowing an operating state of each superframe to transition at a predetermined period, wherein the operating state is determined from three operating states which are an active state in which beacon signal transmission/reception and data transmission/reception are performed as necessary, a sleep state in which beacon signal transmission/reception and data transmission/reception are not performed, and a pre-receive state in which a beacon signal is received and afterward beacon signal transmission and data transmission are not performed, and the operating mode setting device sets a low power consumption mode of transitioning from the sleep state to the pre-receive state in a predetermined superframe period. Further, it is also possible to define a pre-receive state in which a beacon signal is received and afterward beacon signal transmission/reception and data transmission/reception are not performed.

Alternatively, in the low power consumption mode, the wireless communication apparatus in the pre-receive state receives a beacon signal from an adjacent wireless communication apparatus, and at the time of transitioning to the active state according to information contained in the beacon signal, according to the beacon signal the wireless communication apparatus sets transmission timing of a beacon signal (achieve synchronization).

With the wireless communication apparatus as described, in the low power consumption mode (also referred to as a "hibernation mode"), the wireless communication apparatus can transition to the pre-receive state in a predetermined superframe period and receive a beacon signal from an adjacent wireless communication apparatus. Further, at the time of transitioning from the sleep state to the active state according to information contained in the beacon signal, the wireless communication apparatus can receive a beacon signal from an adjacent wireless communication apparatus beforehand and grasp the transmission timing of its own beacon signal. Further, at the time of transitioning from the sleep state to the active state, by receiving a beacon signal from an adjacent wireless communication apparatus, the wireless communication apparatus can grasp the presence of the adjacent wireless communication apparatus and the operating status of the adjacent wireless communication apparatus and describe accurate information in its own beacon signal in the active state.

Alternatively, in the above-described wireless communication apparatus, in the case where the beacon signal received by the wireless communication apparatus in the pre-receive state contains information concerning an activation request addressed thereto, the wireless communication apparatus transitions to the active state. Thus, at the time of transitioning from the sleep state to the active state, the wireless communication apparatus can be activated with sufficient time. In general, it is necessary to have sufficient time (e.g., several hundreds of milliseconds) in order to activate a software section in the process of transition from the sleep state to the active state. In the past, no data can be sent during a time interval between beacon signals such as about 40 milliseconds to 60 milliseconds, thereby causing degradation of system quality. According an embodiment of the invention, there is defined a pre-receive state in which the wireless communication apparatus receives a beacon signal but does not perform beacon signal transmission and data transmission afterward. Thus, the wireless communication apparatus in the pre-receive state can activate the software section while essentially keeping the hardware section in the sleep state.

Alternatively, at the time of transitioning to the active state, the wireless communication apparatus grasps a state of another wireless communication apparatus existing in an adjacent area from the beacon signal received in the pre-receive state and announces its own transmission beacon information about a transition to the active state. Thus, information contained in the beacon signal received in the pre-receive state can be reflected in information contained in a beacon signal that the wireless communication apparatus transmits in the next superframe.

Alternatively, the wireless communication apparatus includes a device configured to detect the presence of a wireless communication apparatus in a low power consumption mode out of adjacent wireless communication apparatuses, and a device configured to add information concerning the presence of the wireless communication apparatus in the low power consumption mode to a beacon signal. With the structure as described, even if there exists a wireless communication apparatus in the low power consumption mode, a collision of beacon signals can be prevented.

Furthermore, the same manner is applied in the case where the wireless communication apparatus changes a position of a beacon slot that the wireless communication apparatus transmits. That is, in the case where the wireless communication apparatus changes a position of a beacon slot that the wireless communication apparatus transmits, the wireless communication apparatus may receive the beacon signal to which the information concerning the presence of another wireless communication apparatus in the low power consumption mode is added and determine to use a beacon slot other than the beacon slot that another wireless communication apparatus in the low power consumption mode has used, as the beacon slot that the wireless communication apparatus transmits.

Further, according to another embodiment of the present invention, there is provided a computer program allowing a computer to function as the above-described wireless communication apparatus and a computer-readable storage medium in which the program is stored. The program may be described in any computer language. Further, the storage medium can include a storage medium that has been commonly used at present for storing programs such as a CD-ROM, a DVD-ROM, and a flexible disk or any storage medium to be used in the future.

As described, according to embodiments of the present invention, in the ad-hoc network, the wireless communication apparatus can transition from the sleep state to the pre-receive state in a predetermined superframe period and receive a beacon signal from an adjacent wireless communication apparatus. Further, at the time of transitioning from the sleep state to the active state according to information contained in the beacon signal, the wireless communication apparatus can receive a beacon signal from an adjacent wireless communication-apparatus beforehand and grasp the transmission timing of its own beacon signal. Further, at the time of transitioning from the sleep state to the active state, by receiving a beacon signal from an adjacent wireless communication apparatus, the wireless communication apparatus can grasp the presence of the adjacent wireless communication apparatus and the operating status of the adjacent wireless communication apparatus and describe accurate information in its own beacon signal in the active state.

Further, in the ad-hoc network, the wireless communication apparatus can set the operating mode autonomously without a particular control station. That is, there is an effect that each wireless communication apparatus can set the active state from the sleep state in an autonomous distributed manner at its own discretion.

Furthermore, by receiving a beacon signal from an adjacent wireless communication apparatus before transitioning to the active state, the wireless communication apparatus can grasp the operation necessary in the case where the wireless communication apparatus is in the active state.

Furthermore, in the ad-hoc network, since the wireless communication apparatus can successively announce information necessary for not only the wireless communication apparatus itself but also an adjacent wireless communication apparatus, it is possible to operate the network effectively without a control station.

Furthermore, by receiving all the adjacent beacon signals before transitioning to the active state, there is an effect that the wireless communication apparatus can grasp its own beacon transmission timing autonomously regardless of the order of transmission positions of beacon signals.

BRIEF DESCRIPTION OF THE DRAWINGS

Embodiments of the present invention will be described in detail based on the following figures, wherein:

FIG. 1 is an explanatory view showing the configuration of an ad-hoc network;

FIG. 2 is an explanatory view exemplifying the configuration of a past network having a control station;

FIG. 3 is an explanatory view exemplifying the structure of a superframe;

FIGS. 4A and 4B are explanatory views exemplifying the operation of a power save mode (sleep mode) in a past system;

FIG. 15 is an explanatory view showing the structure of a beacon slot use information element;

FIG. 16 is an explanatory view exemplifying the specific settings of beacon slot use information elements;

FIGS. 20A and 20B are explanatory views showing examples of a hibernation operation;

FIG. 24 is an explanatory view exemplifying the structure of hibernation mode information;

DETAILED DESCRIPTION

Figure 5A:
FIGS. 5A and 5B are explanatory views exemplifying the operation of a hibernation mode.

Hereinafter, a detailed description will be made of preferred embodiments of a wireless communication system and a wireless communication apparatus according to the present invention with reference to the accompanying drawings. Further, in this specification and the accompanying drawings, a same reference numeral is given to the constituents having the substantially same function so that a repeated description is omitted.

(A) First Embodiment

A first embodiment of the present invention will be described.

(1) Configuration of an Ad-Hoc Network

FIG. 1 shows the configuration of an ad-hoc network. There are shown five adjacent wireless communication apparatuses 111 to 115 constituting an ad-hoc network 100 in FIG. 1 by way of example. In this embodiment, the wireless communication apparatus signifies an apparatus that can perform at least wireless communication, but is not limited to an apparatus that can perform only wireless communication.

An area indicated by dashed lines in FIG. 1 represents the radio wave coverage of a wireless communication apparatus situated at the center thereof. That is, the wireless communication apparatus 111 can communicate with the wireless communication apparatus 112 within a radio wave coverage 121. The wireless communication apparatus 112 can communicate with the wireless communication apparatus 111 and the wireless communication apparatus 113 within a radio wave coverage 122. The wireless communication apparatus 113 can communicate with the wireless communication apparatus 112 and the wireless communication apparatus 114 within a radio wave coverage 123. The wireless communication apparatus 114 can communicate with the wireless communication apparatus 113 and the wireless communication apparatus 115 within a radio wave coverage 124. The wireless communication apparatus 115 can communicate with the wireless communication apparatus 114 within a radio wave coverage 125.

(2) Configuration of a Past Wireless Network Having a Control Station

FIG. 2 exemplifies the configuration of a past wireless network having a control station. There is shown in FIG. 2 a network having a wireless communication apparatus (control station apparatus) 210 which is a control station in the center of a wireless network 200 and having five wireless communication apparatuses 211 to 215 which are terminals within a radio wave coverage 220 of the control station apparatus 210.

In such a network structure, there is generally defined a method that the control station apparatus 210 performs the centralized management of the wireless communication apparatuses 211 to 215 which are terminals and controls the operating modes of the wireless communication apparatuses 211 to 215. That is, only the control station apparatus 210 always operates and repeatedly transmits a predetermined signal so that a wireless communication apparatus can achieve network synchronization by receiving this signal only when the wireless communication apparatus has been activated from a sleep state.

(3) Structure of a Superframe

FIG. 3 exemplifies the structure of a superframe. There is shown in FIG. 3 a superframe period (A) defined with a predetermined time period and a management area (B) and a data transmission area (C) arranged in the superframe period. Further, the wireless communication apparatuses 111 to 115 constitute the ad-hoc network 100 shown in FIG. 1. As described above, the wireless communication apparatus 111 can communicate with the wireless communication apparatus 112, the wireless communication apparatus 112 can communicate with the wireless communication apparatuses 111 and 113, the wireless communication apparatus 113 can communicate with the wireless communication apparatuses 112 and 114, the wireless communication apparatus 114 can communicate with the wireless communication apparatuses 113 and 115, and the wireless communication apparatus 115 can communicate with the wireless communication apparatus 114.

In the management area (B), the wireless communication apparatuses constituting the ad-hoc network transmit respective beacon signals. There is arranged a transmission area of a beacon signal different from those of the other wireless communication apparatuses, in the management area (B). The wireless communication apparatuses 111 to 115 transmit beacon signals to one another, thereby enabling each wireless communication apparatus to grasp the adjacent wireless communication apparatuses and adjust the data transmission area which each wireless communication apparatus uses together with the adjacent wireless communication apparatuses.

In the data transmission area (C), there is set a time band to be used for communication in accordance with request from each wireless communication apparatus. Time bands to be used for communication include a transmission time band (Tx) and a reception time band (Rx). For example, the wireless communication apparatus 113, which has a large amount of data for communication with adjacent wireless communication apparatuses, sets a large amount of communication time, and the wireless communication apparatuses 111 and 115, which have small amounts of data, set small amounts of communication time.

(4) Operation Example of a Power Save Mode in a Past System

FIGS. 4A and 4B exemplify the operation of a power save mode (also referred to as a sleeping mode) in a past system. FIG. 4A shows an example in the case of operating as a normal operating mode. FIG. 4B shows an example in the case of operating as a power save mode.

In the case of the normal operating mode, as shown in FIG. 4A, all superframes are activated so that a wireless communication apparatus performs information exchange such as beacon signal transmission/reception and data transmission/reception as necessary.

In the case of the power save mode, there is determined an active superframe that operates only once at a predetermined power saving cycle. In this superframe, the wireless communication apparatus performs information exchange such as beacon signal transmission/reception and data transmission/reception as necessary. However, in the other superframes which are sleep superframes, the wireless communication apparatus does not perform information exchange such as beacon signal transmission/reception and data transmission/reception.

In the power save mode shown in FIG. 4B, the power saving cycle is defined as five superframes which are four sleep superframes and one active superframe. Further, the power saving cycle to be set for each wireless communication apparatus may be variable in accordance with the frequency of data transmission/reception or the operating status of each wireless communication apparatus.

(5) Operation of a Hibernation Mode

Figure 5B:
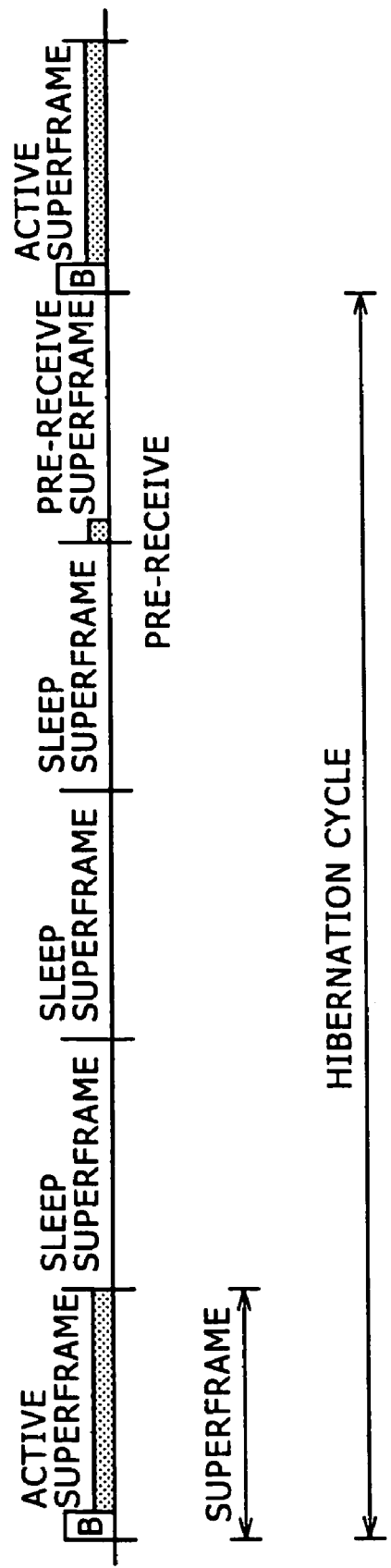

FIGS. 5A and 5B exemplify the operation of a hibernation mode according to this embodiment. FIG. 5A shows an example in the case of operating as a normal operating mode. FIG. 5B shows an example in the case of operating as a power save mode.

In the case of the normal operating mode, as shown in FIG. 5A, all superframes are activated so that a wireless communication apparatus performs information exchange such as beacon signal transmission/reception and data transmission/reception as necessary.

In the case of the hibernation mode, there is determined an active superframe that operates only once at a predetermined hibernation cycle. In this superframe, the wireless communication apparatus performs information exchange such as beacon signal transmission/reception and data transmission/reception as necessary. However, in the other superframes which are sleep superframes, the wireless communication apparatus does not perform information exchange such as beacon signal transmission/reception and data transmission/reception.

In the hibernation mode shown in FIG. 5B, the hibernation cycle is composed of five superframes, and there are defined three sleep superframes and one pre-receive superframe (described later) with respect to one active superframe. Further, the hibernation cycle to be set for each wireless communication apparatus may be variable in accordance with the frequency of data transmission/reception or the operating status of each wireless communication apparatus.

As a feature of the hibernation mode, there is provided a pre-receive superframe (pre-receive period) just before an active superframe as a period during which a wireless communication apparatus receives beacon signals from the adjacent wireless communication apparatuses. Each wireless communication apparatus does not perform data transmission/reception during the pre-receive superframe, but only receives beacon signals from the adjacent wireless communication apparatuses. Further, each wireless communication apparatus adjusts transmission timing of its own beacon signal in the active superframe according to the beacon signals from the adjacent wireless communication apparatuses.

Further, if a wireless communication apparatus receives, during a pre-receive superframe, a beacon signal indicating an activation request addressed thereto, the wireless communication apparatus can be activated prior to the active superframe.

Furthermore, in the example shown in FIG. 5B, the pre-receive superframe is set one superframe before the active superframe. However, the present invention is not limited thereto, and pre-receive superframes may be set from two or three superframes or more before the active superframe.

(6) Frame Structure of the Beacon Signal

Figure 6:
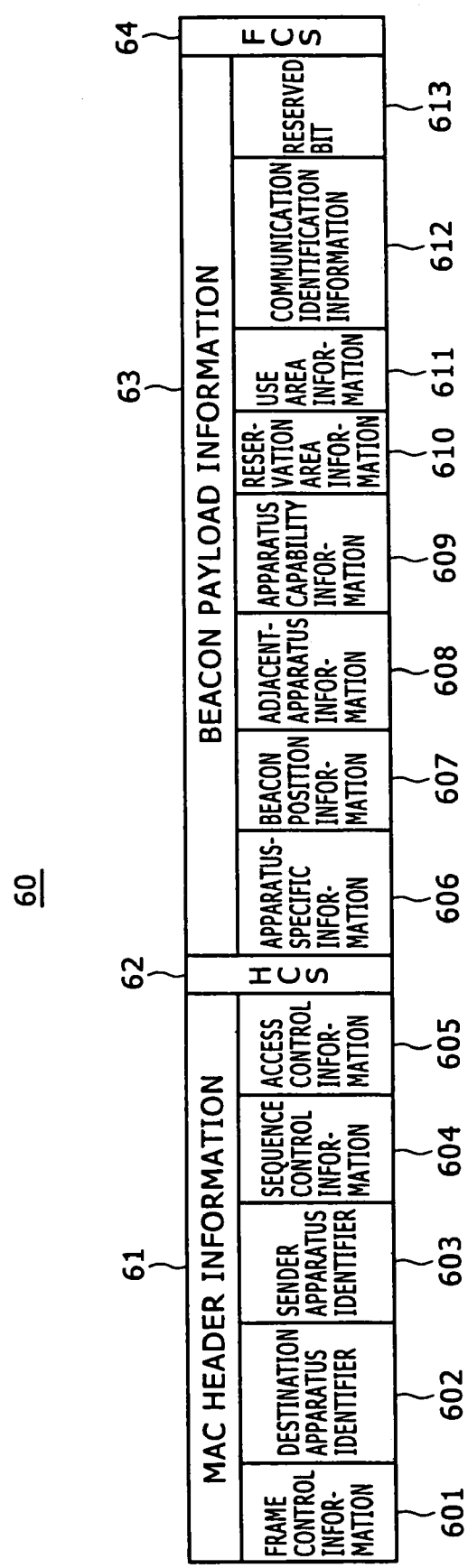
FIG. 6 is an explanatory view exemplifying the frame structure of a beacon signal.

FIG. 6 exemplifies the frame structure of the beacon signal.

A beacon signal 60 according to this embodiment is structured so as to be in common with a data frame etc. As shown in FIG. 6, the beacon signal 60 is structured of MAC header information 61, a header check sequence (HCS) 62 which performs error detection of a header section, beacon payload information 63 which is payload information about the beacon signal, and a frame check sequence (FCS) 64 which performs error detection of the frame.

The MAC header information 61 is structured of frame control information 601 which is control information about the frame, a destination apparatus identifier 602 which is an identifier of a wireless communication apparatus as a destination, a sender apparatus identifier 603 which is an identifier of a wireless communication apparatus as a sender, sequence control information 604 which is a sequence control parameter, access control information 605 which is an access control parameter, and the like.

The beacon payload information 63 is structured of apparatus-specific information 606 which is a parameter specific to the wireless communication apparatus, beacon position information 607 which indicates a transmission position of the beacon signal, adjacent-apparatus information 608 which indicates a wireless communication apparatus existing in the adjacent area, apparatus capability information 609 which indicates the operating capability of the wireless communication apparatus, reservation area information 610 in which a time when reservation transmission is performed in a data area is described, use area information 611 in which a timing usable for communication is described, communication identification information 612 which indicates the presence or absence of data to be transmitted to an adjacent communication apparatus, a reserved bit 613, and the like.

Figure 7:
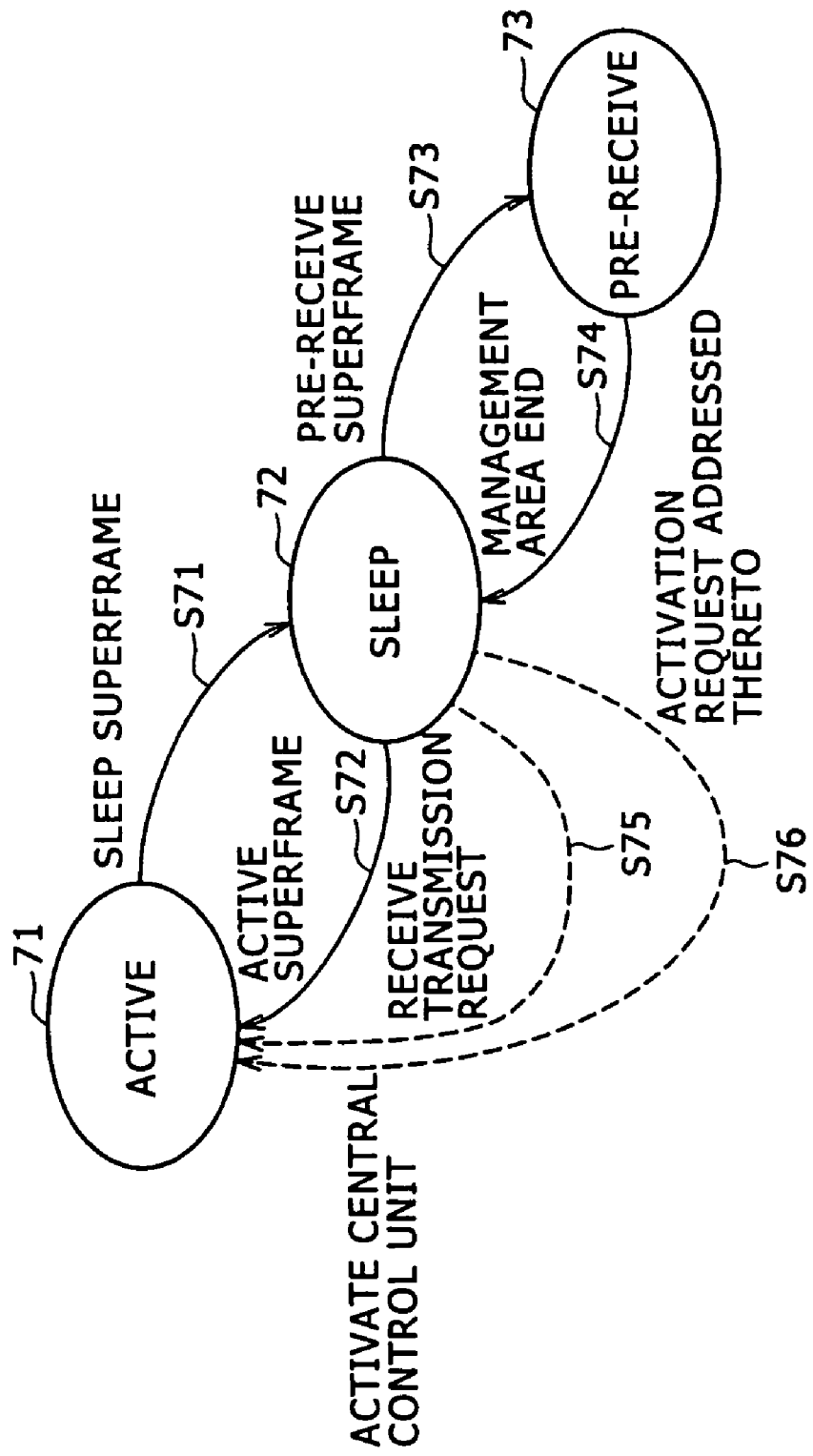
FIG. 7 is an explanatory view showing state transitions in a hibernation mode of a wireless communication apparatus.

(7) Operating State Transition in the Hibernation Mode of the Wireless Communication Apparatus FIG. 7 is an illustration showing state transitions in the hibernation mode of the wireless communication apparatus according to this embodiment. This embodiment defines three operating states which are an active state 71, a sleep state 72, and a pre-receive state 73, as operating states. Further, FIG. 7 shows the relationship between triggers and the thereby caused transitions to operating states.

First, in the hibernation mode, in the case of a superframe in which transmission/reception is performed in the same manner as in the normal operating mode, the operating state is the active state 71. In the active state 71, if the head timing of a superframe arrives and it is a superframe that changes the operating state to the sleep state, the operating state transitions to the sleep state 72 (step S71).

In the sleep state 72, if the head timing of a superframe arrives and it is a superframe that changes the operating state to the active state, the operating state transitions to the active state 71 (step S72).

Further, in the sleep state 72, if the head timing of a superframe arrives and it is a superframe (pre-receive superframe) just before the active state, the operating state transitions to the pre-receive state 73 (step S73).

In the pre-receive state 73, if the management area in which a wireless communication apparatus receives the beacon signals from the adjacent wireless communication apparatuses ends, the operating state transitions to the sleep state 72 again (step S74).

Further, as shown by a broken line arrow, in the pre-receive state 73, if the wireless communication apparatus recognizes a communication request addressed thereto among the beacon signals received from the adjacent wireless communication apparatuses, the operating state may transition to the active state 71 in response to the request. For example, if the communication request addressed thereto is a transmission request, the operating state may immediately transition to the active state 71 (step S75)

Further, if the communication request addressed thereto is an activation request, the wireless communication apparatus may beforehand activate blocks such as a central control unit (reference numeral 810 in FIG. 8) described later prior to the active state so as to prepare for data transmission/reception in the active state (step S76).

(8) Configuration of the Wireless Communication Apparatus

Figure 8:
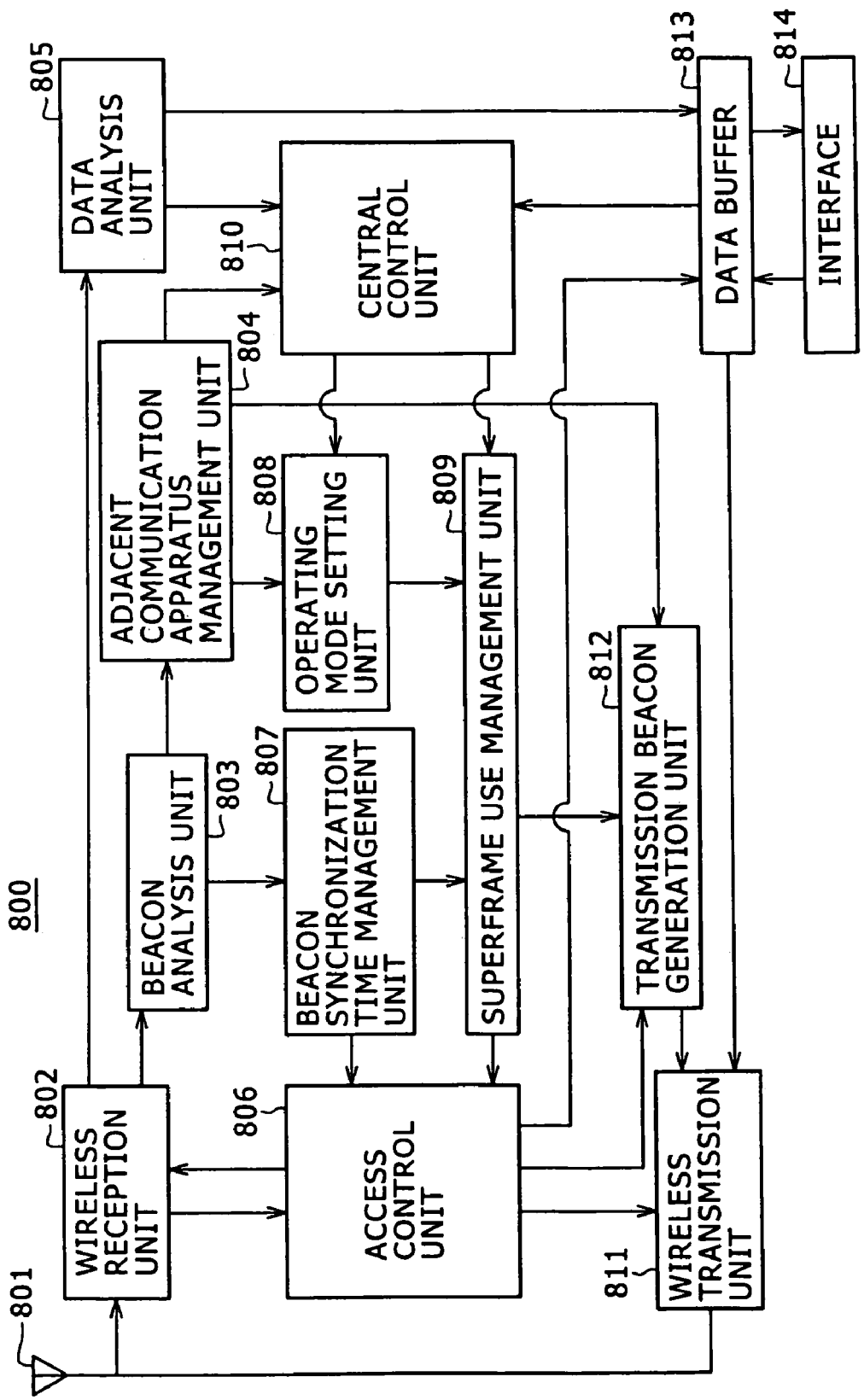
FIG. 8 is a block diagram of a wireless communication apparatus.

FIG. 8 shows a block diagram of the wireless communication apparatus according to this embodiment.

As shown in FIG. 8, a wireless communication apparatus 800 mainly includes an antenna 801, a wireless reception unit 802, a beacon analysis unit 803, an adjacent communication apparatus management unit 804, a data analysis unit 805, an access control unit 806, a beacon synchronization time management unit 807, an operating mode setting unit 808, a superframe use management unit 809, a central control unit 810, a wireless transmission unit 811, a transmission beacon generation unit 812, a data buffer 813, and an interface 814.

The operating mode setting unit 808 (one example of operating mode setting devices according to the invention) sets and manages each operating state in the hibernation mode based on an instruction of the central control unit 810. Notifications of operating modes set by the operating mode setting unit 808 are successively provided to the superframe use management unit 809. Based on the management by the superframe use management unit 809, the access control unit 806 effects the operation of the wireless transmission unit 811 and the wireless reception unit 802.

In the active state or the pre-receive state, a received signal is sent to the wireless reception unit 802 through the antenna 801, and a beacon signal is sent to the beacon analysis unit 803. Based on the received beacon signal, an adjacent wireless communication apparatus is registered in the adjacent communication apparatus management unit 804. Further, the beacon analysis unit 803 sends the reception time of the received beacon signal to the beacon synchronization time management unit 807 to calculate a relative position of its own transmission beacon signal.

Further, the access control unit 806 allows beacon information to be provided to the wireless transmission unit 811 to transmit it by wireless through the antenna 801 when the timing for transmitting an adjusted beacon signal comes.

Transmission position information etc. of the beacon signal of the adjacent wireless communication apparatus in the received beacon signal are provided from the adjacent communication apparatus management unit 804 to the transmission beacon generation unit 812, which sets some parameters of beacon information to be transmitted by this wireless communication apparatus.

Further, the transmission beacon generation unit 812 receives information about a data area used by this wireless communication apparatus from the superframe use management unit 809, and the information is also structured in the beacon information.

Furthermore, information etc. indicating the presence of data to be transmitted to this wireless communication apparatus are provided from the adjacent communication apparatus management unit 804 to the central control unit 810, which provides the reception timing etc. to the superframe use management unit 809, which performs the reception setting.

Furthermore, when the timing comes, the access control unit 806 activates the wireless reception unit 802, which receives data through the antenna 801 and sends the data to the data analysis unit 805, which stores the received data in the data buffer 813, and the data is delivered to an application device (not shown) through the interface 814.

In the case where the wireless communication apparatus receives transmission data from an application device (not shown) connected through the interface 814, the central control unit 810 sets an operating mode in the operating mode setting unit 808 as necessary, the superframe use management unit 809 performs transmission setting in a data area, and the transmission beacon generation unit 812 describes a wireless communication apparatus that needs to receive the data.

(9) Notification of the Operating Mode of Each Wireless Communication Apparatus

Figure 9:
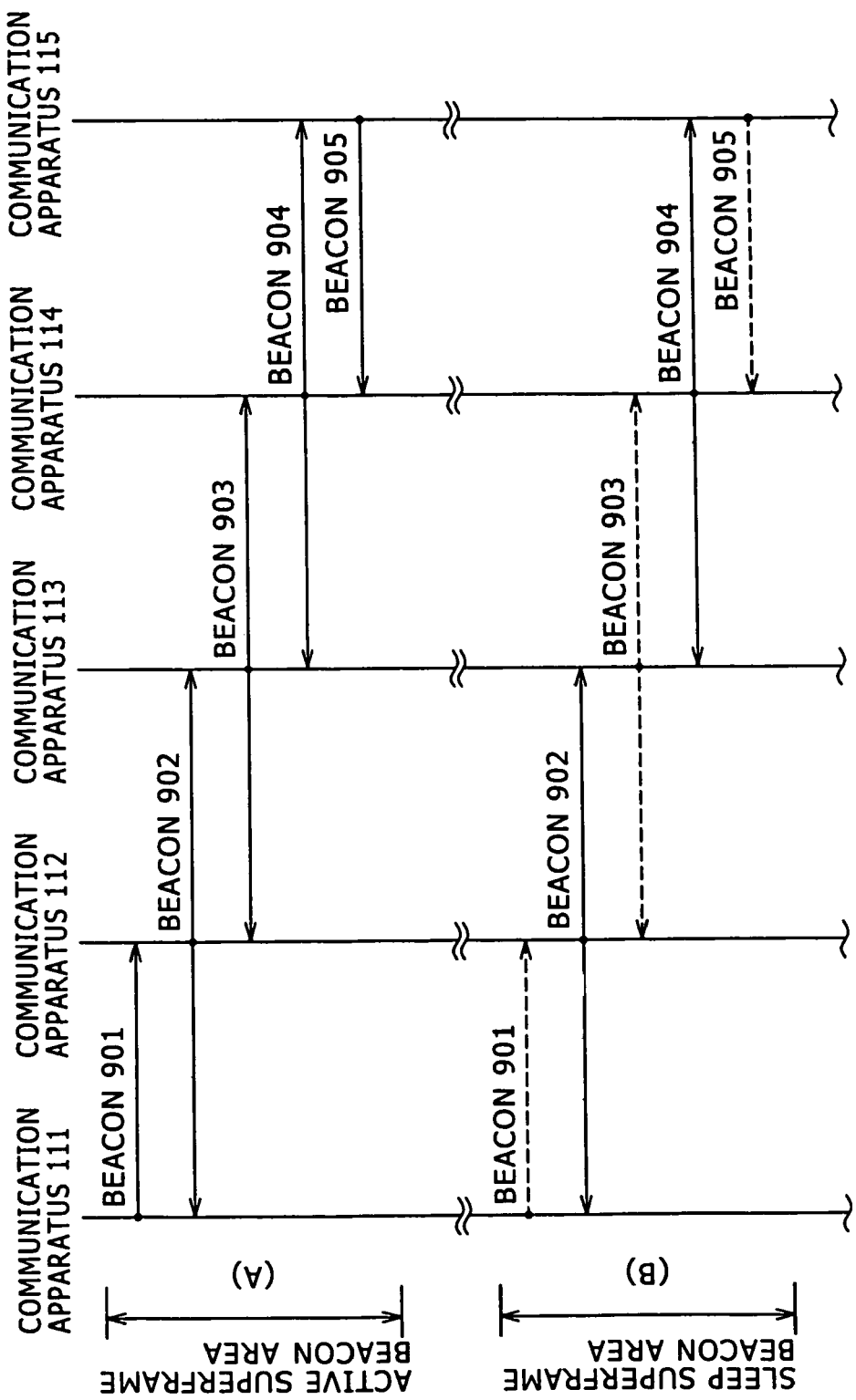
FIG. 9 is an explanatory view exemplifying the notification of the operating mode of each wireless communication apparatus.

FIG. 9 exemplifies the notification of the operating mode of each wireless communication apparatus. FIG. 9 shows (A) an exchange sequence of beacon signals during an active superframe of the hibernation mode and (B) an exchange sequence of beacon signals during a sleep superframe of the hibernation mode.

In FIG. 9, each of the wireless communication apparatuses 111 to 115 announces that it in the hibernation mode, with the beacon information, and the adjacent wireless communication apparatuses grasp the status. In FIG. 9, the wireless communication apparatuses 111, 113 and 115 are in the hibernation mode, and the wireless communication apparatuses 112 and 114 are in the normal operating mode. The wireless communication apparatuses 111 to 115 constitute the ad-hoc network 100 shown in FIG. 1. As described above, the wireless communication apparatus 111 can communicate with the wireless communication apparatus 112, the wireless communication apparatus 112 can communicate with the wireless communication apparatuses 111 and 113, the wireless communication apparatus 113 can communicate with the wireless communication apparatuses 112 and 114, the wireless communication apparatus 114 can communicate with the wireless communication apparatuses 113 and 115, and the wireless communication apparatus 115 can communicate with the wireless communication apparatus 114.

The wireless communication apparatuses 111, 113 and 115 in the hibernation mode do not transmit beacon signals during the sleep superframe (B). However, the wireless communication apparatuses 111, 113 and 115 in the hibernation mode also transmit beacon signals during the active superframe (A).

Further, each of the wireless communication apparatuses 111, 113 and 115 in the hibernation mode describes timing information of the next active superframe in e.g. the access control information 605 of the MAC header information 61 (shown in FIG. 6) in the beacon information to be transmitted during the active superframe so as to notify the adjacent wireless communication apparatuses of it.

Especially in this embodiment, in the hibernation mode, a pre-receive is performed immediately before an active superframe. For example, the wireless communication apparatus 111 performs a pre-receive before an active superframe. As a result, with reference to the thereby received beacon signal 902 from the wireless communication apparatus 112, even the wireless communication apparatus 111 having the first transmission position of a beacon signal in a beacon transmission/reception area can transmit a beacon signal 901 at the head of a superframe without reference to beacon signals 902 to 905 of the other wireless communication apparatuses 112 to 115 after the active state.

(10) Operation of the Wireless Communication Apparatus

Figure 10:
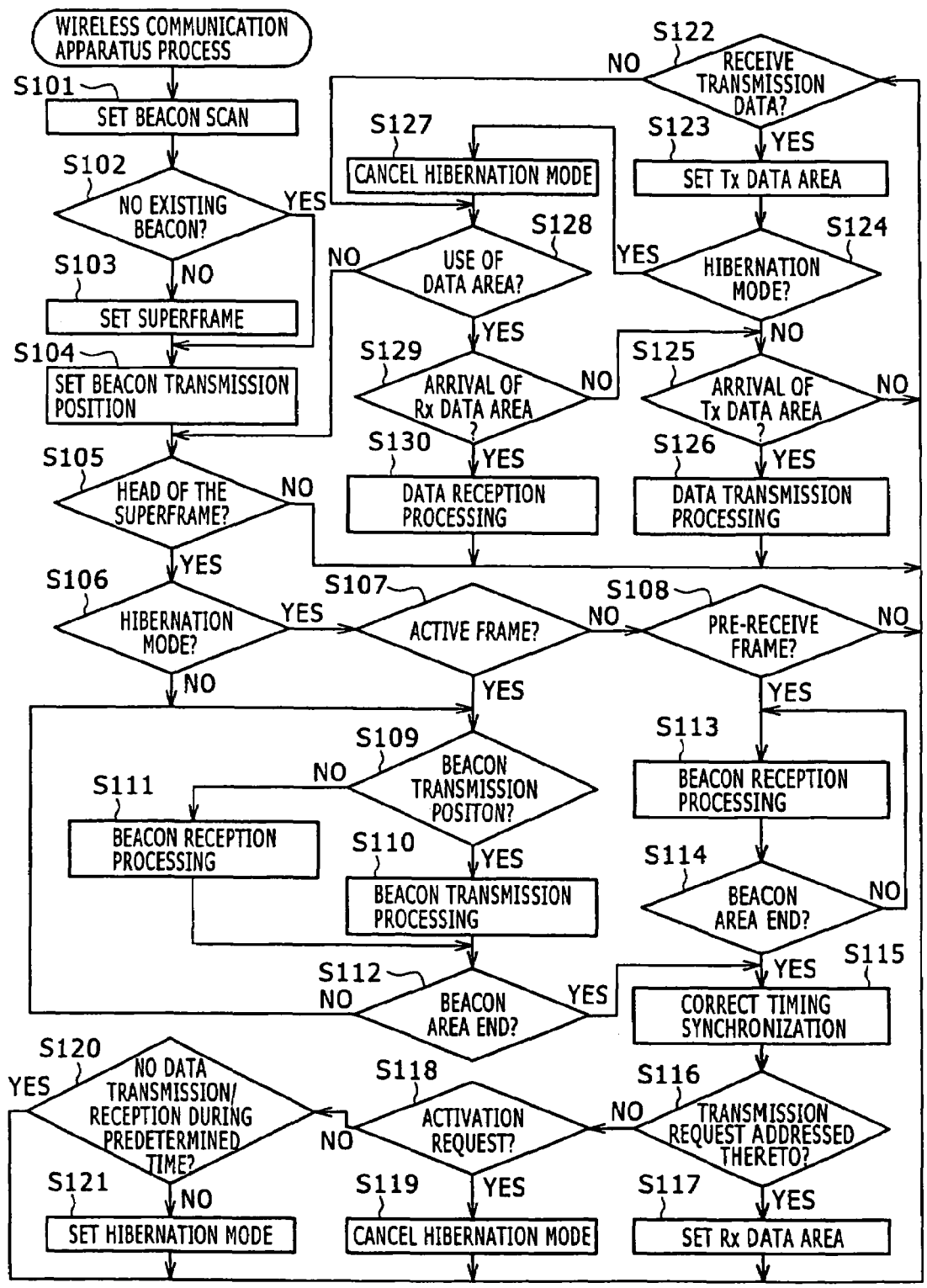
FIG. 10 is a flowchart showing the operation of a wireless communication apparatus according to a first embodiment.

FIG. 10 is a flowchart exemplifies the operation of the wireless communication apparatus according to this embodiment.

The wireless communication apparatus according to this embodiment performs scanning over a predetermined time period (longer than the superframe period) in order to detect beacon signals of the adjacent wireless communication apparatuses immediately after power-on (step S101).

If the wireless communication apparatus cannot receive a beacon signal from the existing wireless communication apparatuses (step S102), the wireless communication apparatus sets a superframe period ((A) in FIG. 3) and a management area ((B) in FIG. 3) for beacon signal transmission (step S103).

Afterward, the wireless communication apparatus determines the transmission position of its own beacon signal with a timing that does not overlap the positions of the adjacent wireless communication apparatuses in the existing management area or the newly set management area (step S104).

If the head timing of a superframe managed by the wireless communication apparatus has come (step S105), the wireless communication apparatus performs the operations from step S106 described below. If the head timing of a superframe has not come, the wireless communication apparatus performs the operations from step S122 described later.

First, the wireless communication apparatus determines whether the wireless communication apparatus operates in the hibernation mode (step S106), and further determines whether the superframe is an active superframe (step S107) or a pre-receive superframe (step S108).

If the superframe is not the hibernation mode or an active superframe in the hibernation mode, the wireless communication apparatus further determines whether the transmission position of its own beacon signal has come (step S109). If the transmission position of the beacon signal has come, the wireless communication apparatus performs transmission processing of the beacon signal (step S110). If the transmission position of the beacon signal has not come, the wireless communication apparatus performs reception processing to receive beacon signals from the adjacent wireless communication apparatuses (step S111).

The beacon signal transmission/reception processing is continued until the management area which is set as a beacon area ends (step S112).

On the other hand, if a pre-receive superframe in the hibernation mode has come, the wireless communication apparatus performs reception processing to receive beacon signals from the adjacent wireless communication apparatuses (step S113).

The beacon signal transmission/reception processing is continued until the management area which is set as a beacon area ends (step S114).

If the management area which is set as a beacon area ends, the wireless communication apparatus performs processing for correcting the timing synchronization of the transmission position of its own beacon signal based on the reception times of the beacon signals of the adjacent wireless communication apparatuses (step S115).

Afterward, if there is a transmission request addressed thereto in the received beacon information (step S116), the wireless communication apparatus sets a data reception area with the requested timing (Rx in FIG. 3) (step S117).

Further, if there is an activation request during the operation as the hibernation mode (step S118), the wireless communication apparatus cancels the hibernation mode (step S119).

Alternatively, if there is no data transmission/reception over a predetermined time period (which can be set to an arbitrary time such as 1 minute) (step S120), the wireless communication apparatus sets the operation to the hibernation mode (step S121).

After the above-mentioned setting/cancellation, or in the case of a sleep superframe in the hibernation mode, if the wireless communication apparatus receives transmission data from a device connected through the interface (step S122), the wireless communication apparatus sets a data transmission area (Tx in FIG. 3) (step S123).

Further, if the wireless communication apparatus is not in the hibernation mode (step S124) and the data transmission area has come (step S125), the wireless communication apparatus transmits data (step S126).

On the other hand, if the wireless communication apparatus is in the hibernation mode, the wireless communication apparatus cancels the hibernation mode (step S127).

After the above-mentioned cancellation, or if the wireless communication apparatus has not received transmission data from the connected device, the wireless communication apparatus checks the presence or absence of use of a data area (step S128). If the data reception area (Rx in FIG. 3) has come (step S129), the wireless communication apparatus receives data (step S130). If the data transmission area has come (step S125), the wireless communication apparatus transmits data (step S126).

Further, if there is no use of a data area as in the case of the sleep superframe in the hibernation mode, no processing is performed until the head of a superframe comes after the data transmission or the data reception is completed in the data area; therefore, it is sufficient to only detect the presence or absence of transmission data. If the head of its own superframe has come, the process returns to step S105 to repeat a series of steps.

Effects of the First Embodiment

As described above, according to this embodiment, in the ad-hoc network 100, the wireless communication apparatus in the sleep state transitions to the pre-receive state in a predetermined superframe period in the hibernation mode, so that the wireless communication apparatus can receive the beacon signals from the adjacent wireless communication apparatuses. Further, at the time of transitioning from the sleep state to the active state in response to information contained in the beacon signals, the wireless communication apparatus can grasp the transmission timing of its own beacon signal by beforehand receiving the beacons from the adjacent wireless communication apparatuses. Furthermore, at the time of transitioning from the sleep state to the active state, by receiving the beacons from the adjacent wireless communication apparatuses, the wireless communication apparatus can grasp the presence of the adjacent wireless communication apparatuses and the operating statuses of the adjacent wireless communication apparatuses and describe accurate information in its own beacon signal in the active state.

Further, in the case where the beacon signals received by the wireless communication apparatus in the pre-receive state contain information about an activation request addressed thereto, the wireless communication apparatus transitions to the active state. Thus, at the time of transitioning from the sleep state to the active state, the wireless communication apparatus can be activated with sufficient time. In general, it is necessary to have sufficient time (e.g., several hundreds of milliseconds) in order to activate a software section in the process of transition from the sleep state to the active state. In the past, no data can be sent during a time interval between beacon signals such as about 40 milliseconds to 60 milliseconds, thereby causing degradation of system quality. In this embodiment, there is defined a pre-receive state in which the wireless communication apparatus receives beacon signals but does not perform beacon signal transmission/reception and data transmission/reception afterward. Thus, the wireless communication apparatus in the pre-receive state can activate the software section while essentially keeping the hardware section in the sleep state.

(B) Second Embodiment

A second embodiment of the present invention will be described.

As described in the first embodiment, there is adopted a method of detecting a beacon slot unoccupied by the adjacent wireless communication apparatuses by informing each other about the use status of the immediately preceding beacon slots among the wireless communication apparatuses constituting the ad-hoc network. That is, each wireless communication apparatus receives the beacon signals from the adjacent wireless communication apparatuses and describes the received beacon slots as "occupied." Further, there is adopted a method of operating a network in such a manner that a wireless communication apparatus using the last beacon slot substitutes an unoccupied beacon slot for the last beacon slot thereby maintaining as short a beacon period as possible.

However, in the hibernation mode described in the first embodiment, since a beacon signal is not transmitted from a wireless communication apparatus in a sleep superframe, there is a possibility that some wireless communication apparatuses determine that a beacon slot is unoccupied and detect the beacon slot by mistake.

Further, in the case where a wireless communication apparatus using the last beacon slot substitutes an unoccupied beacon slot for the last beacon slot, there is a possibility that a beacon signal transmitted by another wireless communication apparatus operable in the hibernation mode collides with a beacon signal of the wireless communication apparatus substituting the unoccupied beacon slot for the last beacon slot due to the transmission with the same beacon slot.

In this embodiment, description will be made as to a method of preventing another communication apparatus from transmitting a beacon signal to a beacon slot with which a beacon signal is transmitted only once in a plurality of superframes and a method of preventing a wireless communication apparatus from substituting an occupied beacon slot for the last beacon slot in the case of substituting an unoccupied beacon slot for the last beacon slot.

More specifically, in order to identify a beacon slot with which a beacon signal is transmitted only once in a plurality of superframes in the hibernation mode, a state parameter indicating reserved use in the hibernation mode is added to the information element announcing the beacon slot use status. The state parameter can be added to, for example, the reserved bit 613 of the beacon signal 60 shown in FIG. 6.

(1) Structure of an Ad-Hoc Network

The structure of an ad-hoc network according to the second embodiment is the same as in the first embodiment (FIG. 1, etc).

Figure 11:
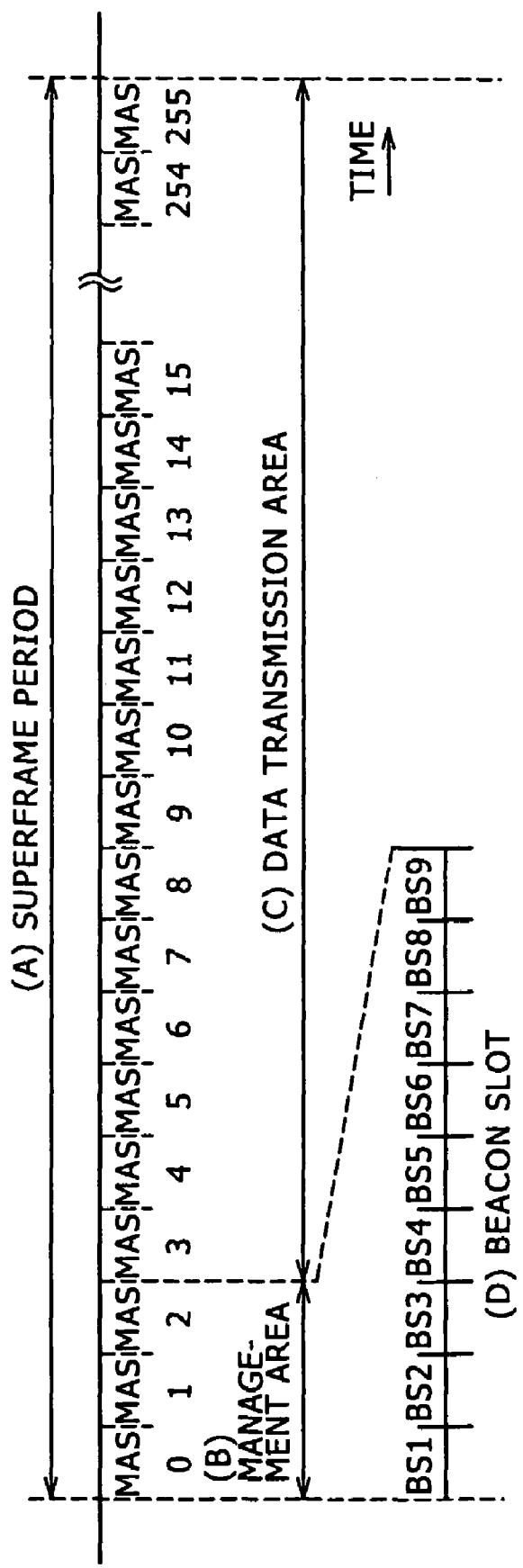
FIG. 11 is an explanatory view exemplifying the structure of a superframe.

(2) Structure Example of a Superframe (FIG. 11)

FIG. 11 exemplifies the structure of a superframe. This embodiment describes a superframe period (A) defined with a predetermined time period and further divided into 256 (0 to 255) media access slots (MAS). FIG. 11 shows a management area (B) (also referred to as a beacon period) and a data transmission area (C) arranged in the superframe period (A).

Further, beacon slots (D) are set at predetermined intervals in the management area (B), and parameters are exchanged with the adjacent wireless communication apparatuses by using beacon slots specific to respective wireless communication apparatuses.

Figure 12:
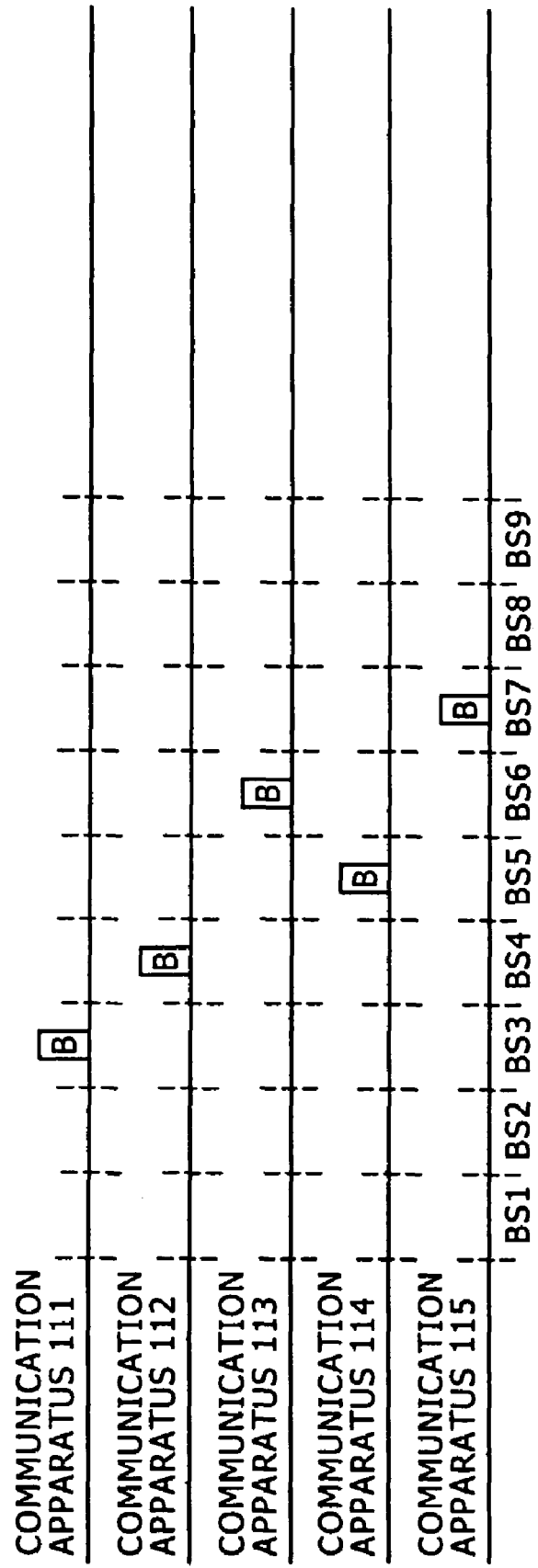
FIG. 12 is an explanatory view exemplifying the use setting of beacon slots.

(3) Example of the Use Setting of Beacon Slots (FIG. 12)

FIG. 12 shows an example of the use setting of beacon slots. Further, FIG. 12 shows the result of selecting the beacon slot for use by each wireless communication apparatus constituting a network group after each wireless communication apparatus informs the adjacent wireless communication apparatuses about unoccupied beacon slots.

In FIG. 12, the wireless communication apparatus 111 transmits its own beacon signal with a beacon slot 3 (BS3). The wireless communication apparatus 112 transmits its own beacon signal with a beacon slot 4 (BS4). The wireless communication apparatus 113 transmits its own beacon signal with a beacon slot 6 (BS6). The wireless communication apparatus 114 transmits its own beacon signal with a beacon slot 5 (BS5). The wireless communication apparatus 115 transmits its own beacon signal with a beacon slot 7 (BS7).

Further, as necessary, a beacon slot 1 (BS1), a beacon slot 2 (BS2), a beacon slot 8 (BS8), and a beacon slot 9 (BS9) are reserved for wireless communication apparatuses newly joining the network group. Furthermore, the beacon slot 1 (BS1) and the beacon slot 2 (BS2) are also referred to as signaling beacon slots, and may be used for adjustment of the beacon slot of a wireless communication apparatus newly joining the network group. Furthermore, the number of beacon slots can be set arbitrarily (e.g., 96).

(4) Operation Example of a Hibernation Mode

The operation of a hibernation mode according to the second embodiment is the same as in the first embodiment (FIG. 5, etc.).

As shown in FIG. 5B, the hibernation mode according to this embodiment refers to the mode in which the wireless communication apparatus in the sleep state transitions to the pre-receive state or the active state in a predetermined superframe period. However, in this embodiment, the pre-receive superframe shown in FIG. 5B is not necessarily required. That is, the hibernation mode according to this embodiment includes the mode in which the wireless communication apparatus in the sleep state transitions to the active state in a predetermined superframe period.

Figure 13:
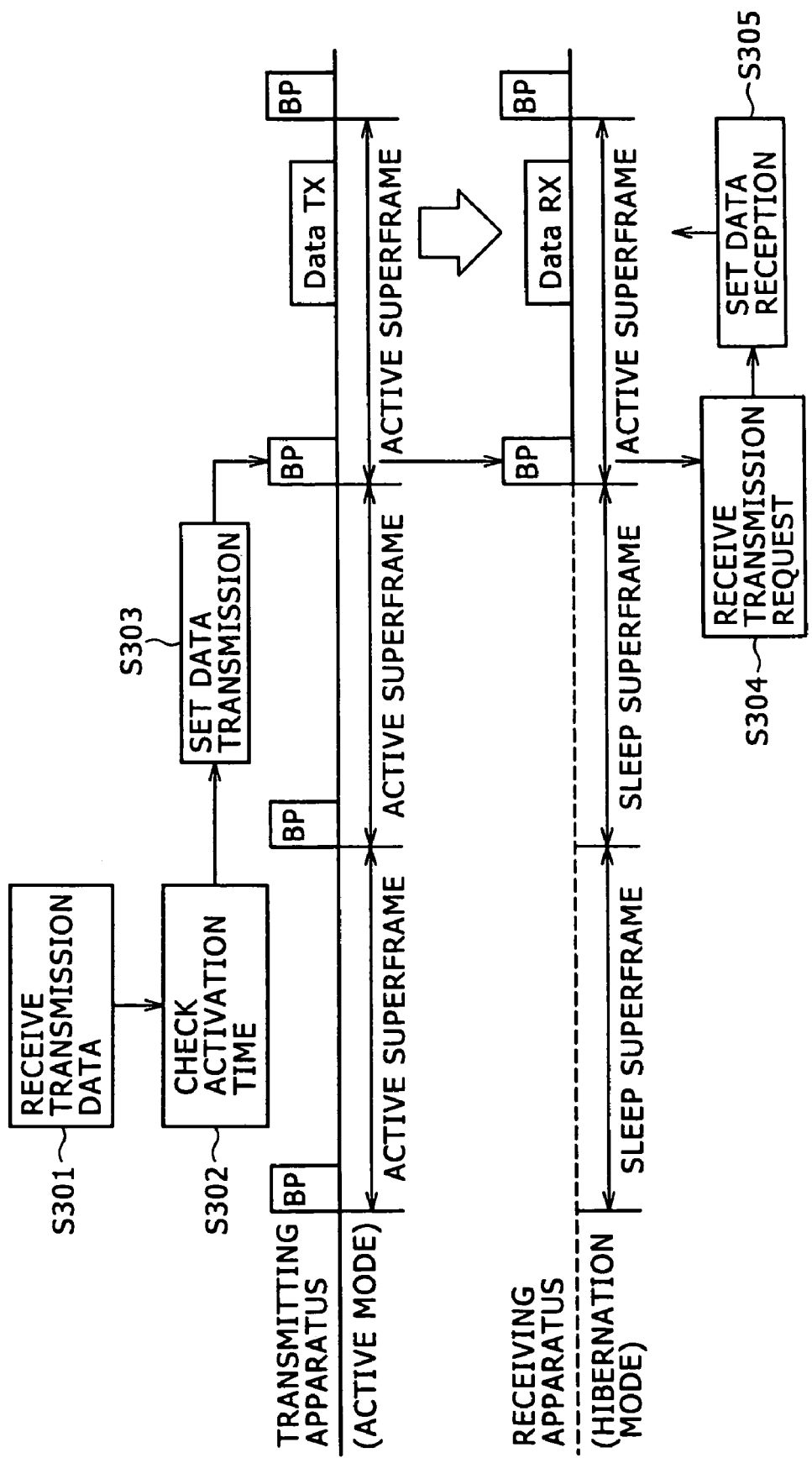
FIG. 13 is an explanatory view exemplifying the setting in which a wireless communication apparatus in an active mode transmits data to a wireless communication apparatus in a hibernation mode.

(5) Setting Example of Data Transmission/Reception (5-1) Setting Example in Which a Wireless Communication Apparatus in the Active Mode Transmits Data to a Wireless Communication Apparatus in the Hibernation Mode (FIG. 13)

FIG. 13 shows a setting example in which a wireless communication apparatus in the active mode transmits data to a wireless communication apparatus in the hibernation mode. As described above, the hibernation mode according to this embodiment does not necessarily require a pre-receive superframe; therefore, FIG. 13 does not show a pre-receive superframe in the hibernation mode. However, a pre-receive superframe may be present, for example, beyond the area shown in FIG. 13.

If a sender wireless communication apparatus receives transmission data addressed to a wireless communication apparatus in the hibernation mode (step S301), the transmitting apparatus stores the data temporarily. Further, as necessary, the transmitting apparatus checks the activation time (step S302) and sets a data transmission area (step S303). As described in the first embodiment, in the wireless communication apparatus in the hibernation mode, an active superframe is set only once at a predetermined period (FIG. 4). At an active superframe, the transmitting apparatus transmits a transmission request with the beacon signal during an active superframe of the wireless communication apparatus in the hibernation mode.

Since the beacon signals from the adjacent wireless communication apparatuses are received during an active superframe of the wireless communication apparatus in the hibernation mode, the wireless communication apparatus in the hibernation mode receives the transmission request (step S304), acquires the data transmission area designation described therein (step S305), and receives the data with the timing thereof.

Further, when the data transmission timing comes, the sender wireless communication apparatus transmits the data to the destination wireless communication apparatus.

Figure 14:
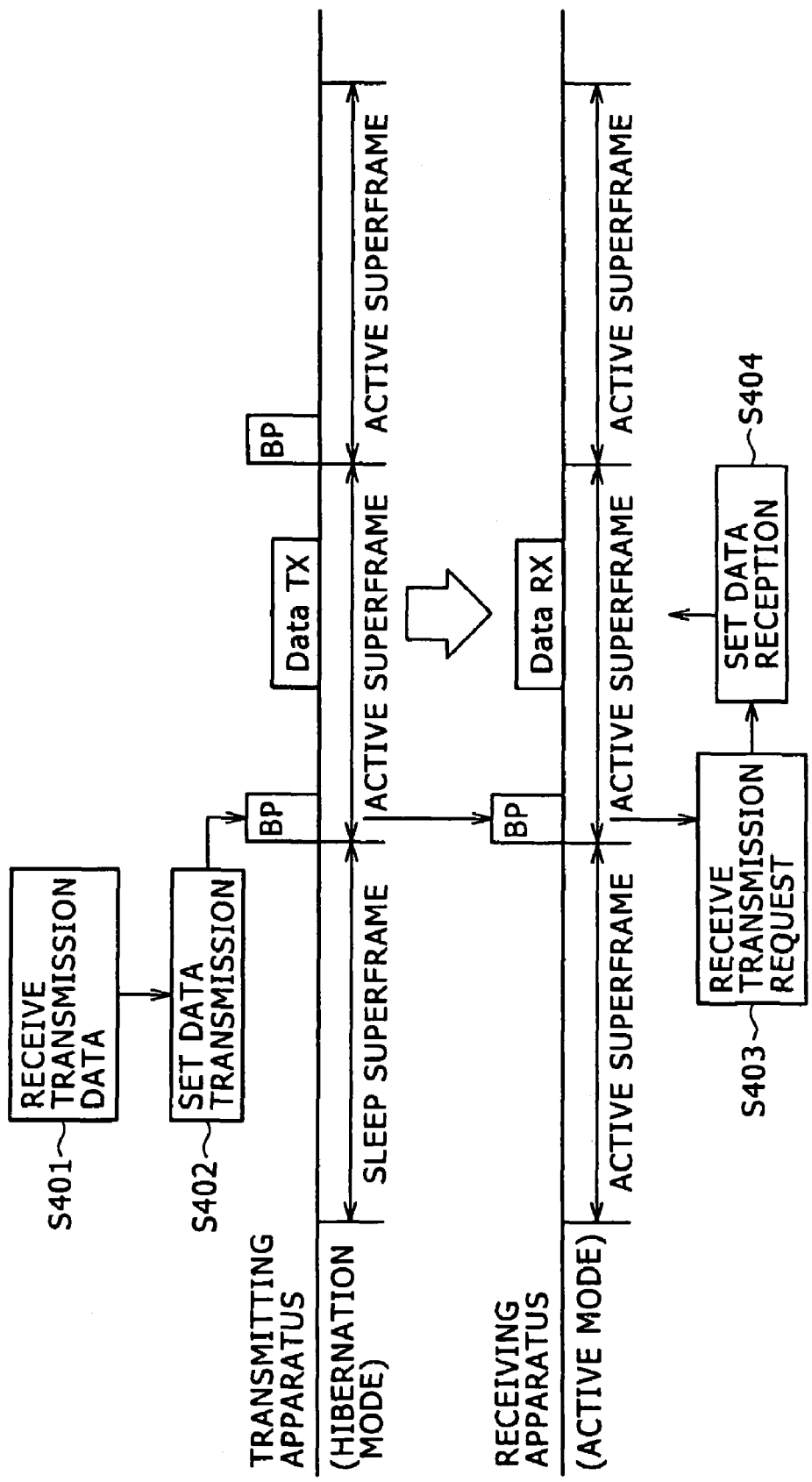
FIG. 14 is an explanatory view exemplifying the setting in which a wireless communication apparatus in a hibernation mode transmits data to a wireless communication apparatus in an active mode.

(5-2) Setting Example in Which the Wireless Communication Apparatus in the Hibernation Mode Transmits Data to the Wireless Communication Apparatus in the Active Mode (FIG. 14)

FIG. 14 shows a setting example in which the wireless communication apparatus in the hibernation mode transmits data to the wireless communication apparatus in the active mode. As described above, the hibernation mode according to this embodiment does not necessarily require a pre-receive superframe; therefore, FIG. 14 does not show a pre-receive superframe in the hibernation mode. However, a pre-receive superframe may be present, for example, beyond the area shown in FIG. 14.

If the wireless communication apparatus in the hibernation mode receives transmission data (step S401), the wireless communication apparatus operates to store the data temporarily and set a data transmission area as necessary (step S402). As described in the first embodiment, in the wireless communication apparatus in the hibernation mode, an active superframe is set only once at a predetermined period (FIG. 4). At an active superframe, the wireless communication apparatus in the hibernation mode transmits a transmission request with the beacon signal of the beacon slot in the next active superframe.

Since the destination wireless communication apparatus in the active mode receives the beacon signals from the adjacent wireless communication apparatuses, the destination apparatus receives the beacon signal from the wireless communication apparatus in the hibernation mode. Thus, the destination apparatus receives the transmission request from the wireless communication apparatus in the hibernation mode (step S403), acquires the data transmission area designation described therein (step S404), and receives the data with the timing thereof.

Further, when the data transmission timing comes, the sender wireless communication apparatus transmits the data to the destination wireless communication apparatus.

(6) Structure Example of a Beacon Frame

The structure of a beacon frame according to the second embodiment is the same as in the first embodiment (FIG. 6). The following is an example in which the beacon position information 607 is structured as a beacon slot use information element described below.

(7) Information Element (7-1) Structure of a Beacon Slot Use Information Element (FIG. 15)

FIG. 15 shows the structure of an information element about the use status of a beacon slot (referred to as a "beacon slot use information element").

As shown in FIG. 15, the beacon slot use information element is structured of an element ID 701 specific to the information element, an information length 702 of the frame, a BP length 703 indicating the length of a management area (beacon period), a beacon slot information bitmap 704 indicating the use status of the beacon slot, and address information 705 to which the addresses of the received wireless communication apparatuses are successively added. The bit length of the element ID 701, the information length 702, and the BP length 703 is 1 octet (8 bits) for example. The bit length of the beacon slot information bitmap 704 is K octets (=BP length×2 bits) for example. The bit length of the address information of one beacon signal in the address information 705 is 2 octets (16 bits) for example.

The following are the set values of the beacon slot information bitmap 704 in this embodiment.

00: Unoccupied
01: PHY Indication
10: Hibernation Sleep
11: Occupied

Among the set values, the PHY Indication (01) may be set, for example, if there is an error with the header check sequence (HCS) 62 or the frame check sequence (FCS) 64 in the beacon frame shown in FIG. 6. Further, the Hibernation Sleep (10) indicates that an adjacent wireless communication apparatus is in the hibernation mode.

An element indicating "Hibernation Sleep" in the beacon slot use information element may be defined separately, structured as an information element other than in this embodiment, and added to, for example, the reserved bit 613 shown in the beacon signal 60.

FIG. 16 is an explanatory drawing exemplifying the specific settings of the beacon slot use information elements of the wireless communication apparatuses 111 to 115 (FIG. 1). FIG. 16 shows only the length of the management area (beacon period) 703, the use status of the beacon slot 704, and the address information 705 out of the beacon slot use information element.

As shown in FIG. 12, since the wireless communication apparatus 111 recognizes the use of its own beacon slot (BS3) and the beacon slot (BS4) of the adjacent wireless communication apparatus 112, the BP length is set to 6. The wireless communication apparatus 111 sets the bitmaps corresponding to the beacon slots to be used, and then successively adds the addresses of wireless communication apparatuses that use the beacon slots BS3 and BS4.

Since the wireless communication apparatus 112 recognizes the use of its own beacon slot (BS4), the beacon slots (BS3) of the adjacent wireless communication apparatus 111, and the beacon slots (BS6) of the adjacent wireless communication apparatus 113, the BP length is set to 8. The wireless communication apparatus 112 sets the bitmaps corresponding to the beacon slots to be used, and then successively adds the addresses of wireless communication apparatuses that use the beacon slots BS3, BS4, and BS6.

Since the wireless communication apparatus 113 recognizes the use of its own beacon slot (BS6), the beacon slots (BS4) of the adjacent wireless communication apparatus 112, and the beacon slots (BS5) of the adjacent wireless communication apparatus 114, the BP length is set to 8. The wireless communication apparatus 113 sets the bitmaps corresponding to the beacon slots to be used, and then successively adds the addresses of wireless communication apparatuses that use the beacon slots BS4, BS5, and BS6.

Since the wireless communication apparatus 114 recognizes the use of its own beacon slot (BS5), the beacon slots (BS6) of the adjacent wireless communication apparatus 113, and the beacon slots (BS7) of the adjacent wireless communication apparatus 115, the BP length is set to 9. The wireless communication apparatus 114 sets the bitmaps corresponding to the beacon slots to be used, and then successively adds the addresses of wireless communication apparatuses that use the beacon slots BS5, BS6, and BS7.

Since the wireless communication apparatus 115 recognizes the use of its own beacon slot (BS7) and the beacon slot (BS5) of the adjacent wireless communication apparatus 114, the BP length is set to 9. The wireless communication apparatus 115 sets the bitmaps corresponding to the beacon slots to be used, and then successively adds the addresses of wireless communication apparatuses that use the beacon slots BS5 and BS7.

Figures 17, 18:
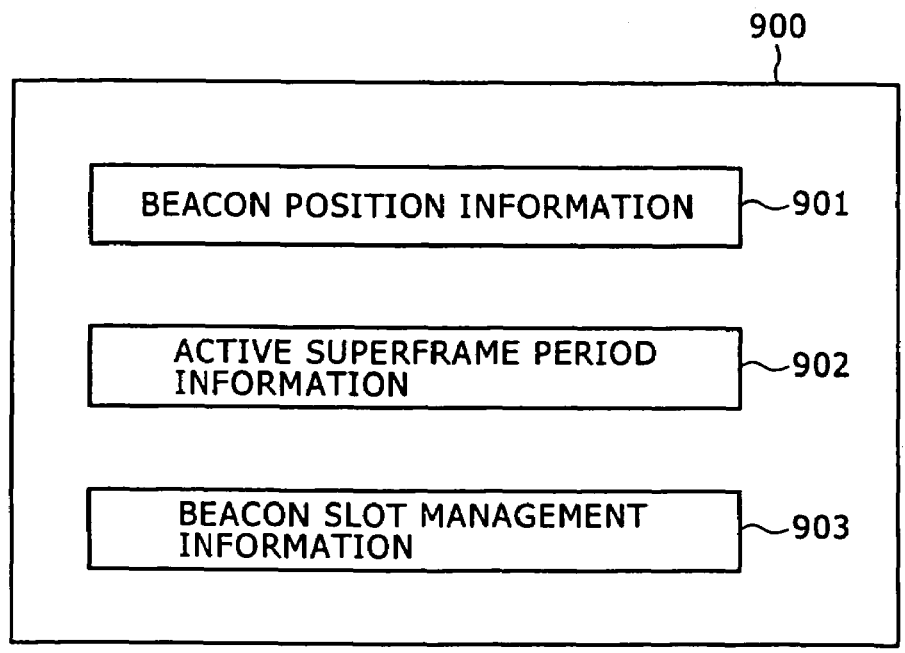
FIG. 17 is an explanatory view showing a hibernation mode information element.
FIG. 18 is an explanatory view showing a beacon parameter list.

(7-2) Hibernation Mode Information Element (FIG. 17)

FIG. 17 shows a hibernation mode information element. The hibernation mode information element is structured of an element ID 711 specific to the information element, an information length 712, a hibernation countdown value 713 until entry into the hibernation mode, and a hibernation duration 714. Each of the bit lengths is 1 octet (8 bits) for example.

(8) Structure Example of the Wireless Communication Apparatus

The structure of the wireless communication apparatus according to the second embodiment is the same as in the first embodiment (FIG. 8).

Further, this embodiment is characterized in that each wireless communication apparatus includes a beacon parameter list. The beacon parameter list is information obtained from the beacon signals transmitted from the adjacent wireless communication apparatuses.

FIG. 18 is an explanatory drawing showing the beacon parameter list. As shown in FIG. 18, a beacon parameter list 900 includes beacon position information (Beacon Slot Occupancy) 901, active superframe period information (Hibernation Duration) 902, and beacon slot management information (Beacon Slot Management) 903.

The beacon position information (Beacon Slot Occupancy) 901 is obtained by receiving the beacon signals of the adjacent wireless communication apparatuses, and corresponds to a value described in the beacon position information 607 in the received beacon signal 60 shown in FIG. 6. The active superframe period information (Hibernation Duration) 902 is directed to the period of arrival of an active superframe of a wireless communication apparatus in the hibernation mode, and parameters beforehand described in the beacon signals of the adjacent wireless communication apparatuses are stored therein. The beacon slot management information (Beacon Slot Management) 903 indicates the occupied beacon slots that the wireless communication apparatus recognizes. As the value corresponding to the adjacent-apparatus information 608 in the received beacon signal 60, the beacon slot management information (Beacon Slot Management) 903 is necessary to manage beacon slots of other communication apparatuses that are hidden terminals for this communication apparatus.

The beacon parameter list 900 is used to manage information obtained from the beacon signals transmitted from the adjacent wireless communication apparatuses, as to the adjacent communication apparatuses. Further, it is possible to store the beacon parameter list 900, for example, in a memory space in the adjacent communication apparatus management unit 804 or in a memory space in the access control unit 806.

Figure 19:
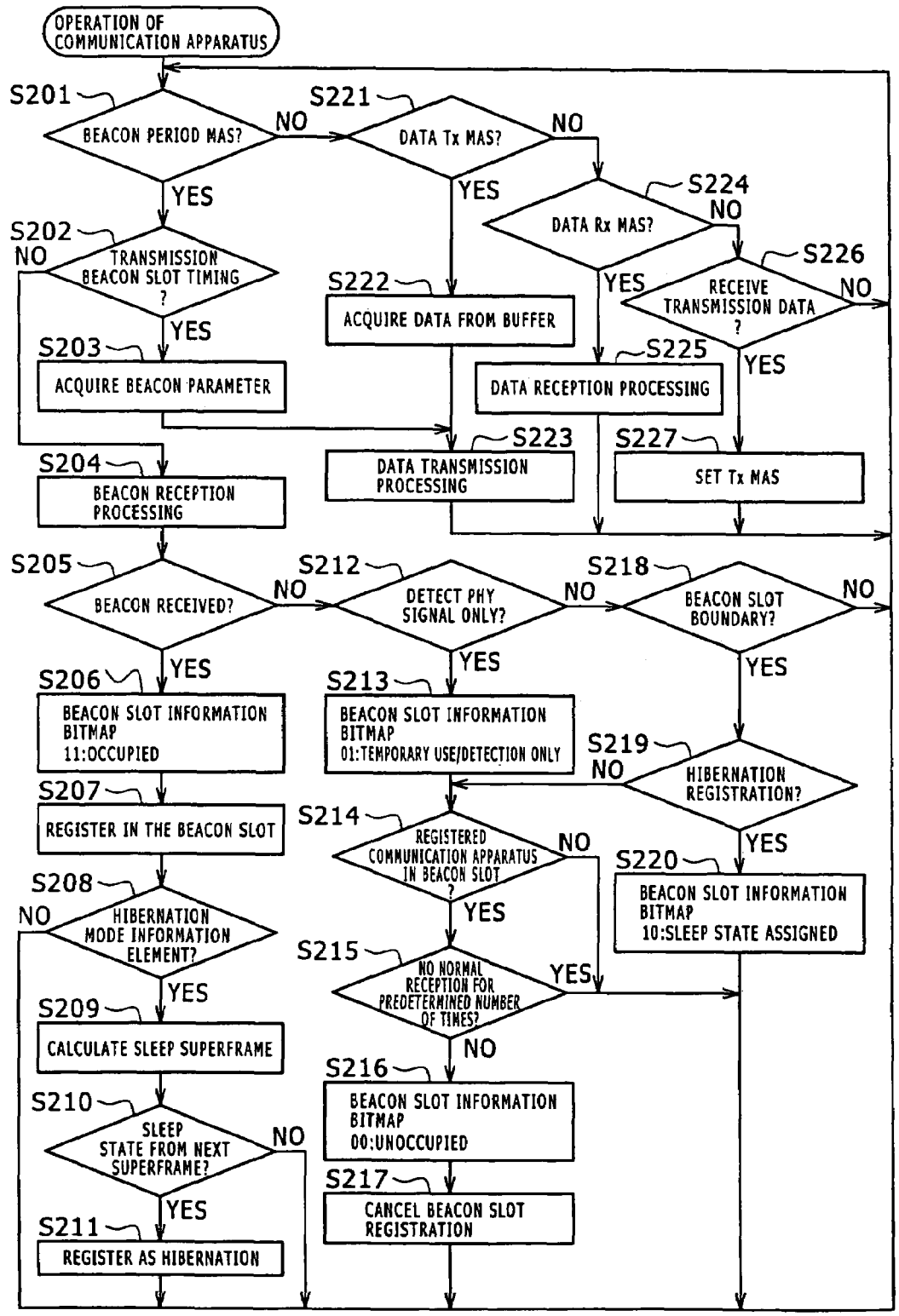
FIG. 19 is a flowchart showing the operation of a wireless communication apparatus according to a second embodiment.

(9) Operation of the Wireless Communication Apparatus (FIG. 19)

FIG. 19 is a flowchart showing the operation of the wireless communication apparatus according to this embodiment. Each wireless communication apparatus performs each operation in accordance with a use method that is set for each MAS when the start time of a MAS comes.

First, if the MAS is a beacon period MAS (step S201) and it is a timing of the transmission beacon slot (S202), the wireless communication apparatus acquires a beacon parameter (step S203) and performs transmission processing (step S223).

If the MAS is a beacon period MAS (step S201) and it is not a timing of the transmission beacon slot, the wireless communication apparatus performs beacon reception processing (step S204). If there is beacon reception (step S205), the wireless communication apparatus sets the corresponding part of the own beacon slot information bitmap (704 in FIG. 15) to "11: Occupied" (step S206) and registers the information about the corresponding wireless communication apparatus in the beacon slot management information (903 in FIG. 18). (step S207).

Further, if there is a description of a hibernation mode information element (FIG. 17) (step S208), the wireless communication apparatus specifies a sleep superframe period (step S209). In the case of entry into the sleep state from the next superframe (step S210), the wireless communication apparatus registers the corresponding wireless communication apparatus as the sleep state in the hibernation mode (step S211).

Further, if the wireless communication apparatus detects only a PHY signal of a beacon signal and there is an error with the header check sequence (62 in FIG. 6) or the frame check sequence (64 in FIG. 6) (step S212), the wireless communication apparatus sets the corresponding part of the own beacon slot information bitmap (704 in FIG. 15) to "01: temporary use/detection only" (step S213). If there is a registered communication apparatus in the corresponding beacon slot (step S214) and there is no reception continuously for a predetermined number of times (step S215), the wireless communication apparatus sets the corresponding part of the own beacon slot information bitmap (704 in FIG. 15) to "00: Unoccupied" (step S216) and cancels the registration of the corresponding communication apparatus information (step S217).

Further, if there is no registered communication apparatus in the corresponding beacon slot or if the number of no receptions is smaller than the predetermined number, the wireless communication apparatus exits a series of steps.

Further, if there is no signal detection and the boundary of beacon slots has come (step S218) and there is a hibernation registration (step S219), the wireless communication apparatus sets the corresponding part of the own beacon slot information bitmap (704 in FIG. 15) to "10: sleep state assigned" (step S220).

Furthermore, if there is no hibernation registration, the process moves to step S214, where the wireless communication apparatus checks if there is no reception continuously for a predetermined number of times to determine whether or not to cancel the registration.

If the MAS is a data transmission MAS (Data Tx MAS) (step S221), the wireless communication apparatus acquires data from the buffer (step S222) and performs transmission processing (step S223).

Further, if the MAS is a data reception MAS (Data Rx MAS) (step S224), the wireless communication apparatus performs data reception processing (step S225). Furthermore, if the wireless communication apparatus receives data addressed thereto, the wireless communication apparatus stores the data in the buffer and outputs it to a connected application device through the interface (not shown).

Furthermore, if the wireless communication apparatus receives transmission data from a connected application device through the interface (step S226), the wireless communication apparatus sets a data transmission MAS as necessary (step S227).

If the series of steps ends, the process returns to step S201, thereby continuing the operation of the wireless communication apparatus.

Effects of the Second Embodiment

As described above, according to this embodiment, in order to identify a beacon slot with which a beacon signal is transmitted only once in a plurality of superframes in the hibernation mode, a state parameter indicating reserved use in the hibernation mode is added to the information element announcing the beacon slot use status, thereby making it possible to prevent another communication apparatus from transmitting a beacon signal to the beacon slot. Further, it is possible to prevent a wireless communication apparatus from substituting an occupied beacon slot for the last beacon slot in the case of substituting an unoccupied beacon slot for the last beacon slot.

(C) Third Embodiment

A third embodiment of the present invention will be described.

As a media access technology applied to a wireless personal area network (PAN), IEEE802. 15. 3 is being studied, and as an access scheme of multi-band OFDM (MB-OFDM), a Distributed_MAC draft specification is being studied. It is possible to use the hibernation mode (sleep mode) in which a wireless communication apparatus transitions to the active state of one superframe after transitioning to the sleep state over a plurality of superframes as described in the first and second embodiments, as a setting method of a sleep state for the low power consumption operation defined in IEEE802. 15. 3 or Distributed_MAC.

Distributed_MAC defines a structure for exchanging various kinds of information and parameters using beacon frames exchanged between adjacent communication apparatuses during a beacon period in a superframe. More specifically, it is structured such that requests and responses for setting a transmission line by a reservation communication control method with a distributed reservation protocol (DRP) are exchanged as an implicit negotiation technique.

In the technique, since there is no guarantee that a specific signal can always be received in an unstable wireless communication environment, even if a beacon signal that a communication apparatus basically transmits only once in superframes cannot be received, it is not directly determined that the communication apparatus has disappeared, but if beacon signals cannot be received continuously over a plurality of times, it is detected that the communication apparatus has disappeared.

However, in the case of exchanging various kinds of parameters with a communication apparatus operating in the hibernation mode described in the first and second embodiments, since the communication apparatus transitions to the sleep state after the superframe that makes a parameter request, there is disadvantageously a wait for sending the parameter response until the next active superframe.

In the case of applying the past disappearance and detection technique to the communication apparatus operating in the hibernation mode described in the first and second embodiments, since it cannot be detected that beacons disappear over continuous superframes, continuous disappearance needs to be detected with the next active superframe. For this reason, even though a communication apparatus has already disappeared, the accurate presence cannot be grasped over a long time.

In this embodiment, as a technique for solving the above-described problem, a description will be made of a method for defining the operation of the hibernation mode in which a communication apparatus maintains the active state over a plurality of superframes after transitioning to the sleep state over a plurality of superframes and further transitions to the sleep state.

Figure 21:
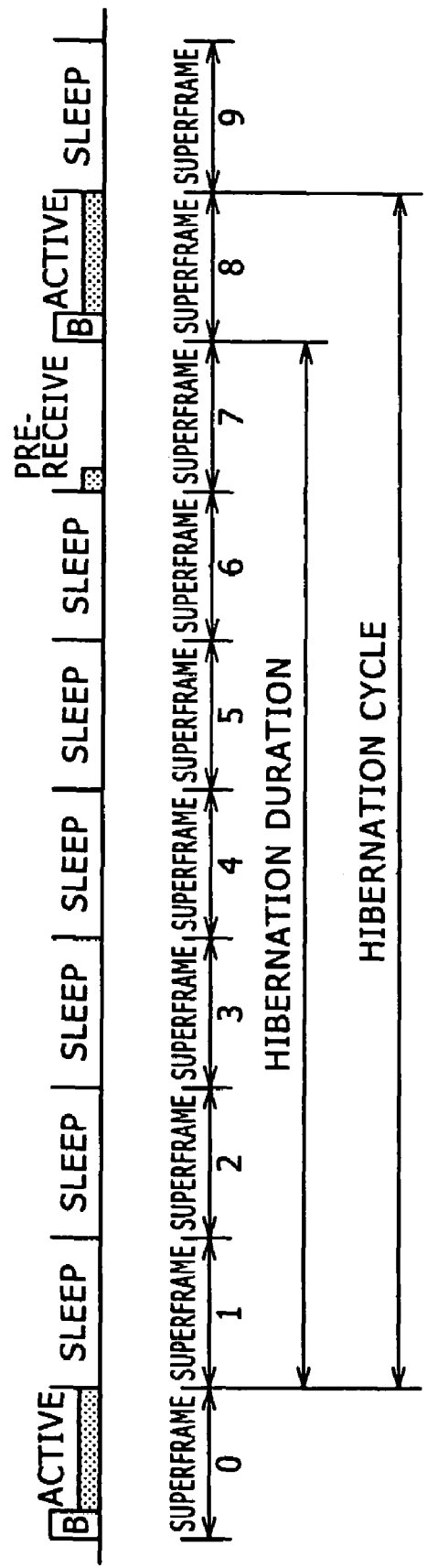
FIG. 21 is an explanatory view showing a hibernation operation according to first and second embodiments.
Figure 22:
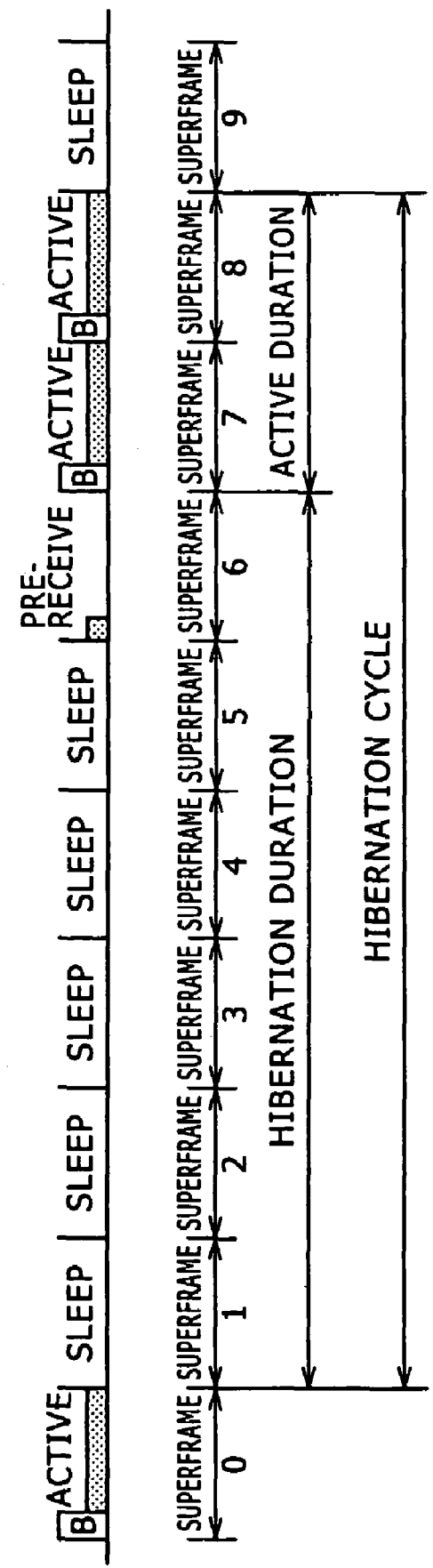
FIG. 22 is an explanatory view showing a hibernation operation according to a third embodiment.

(1) Hibernation Operation (FIGS. 20 to 22)

A hibernation operation according to this embodiment will be described with reference to FIGS. 20 to 22.

FIGS. 20A and 20B show the operation of a past sleep mode. In FIG. 20A, there always exist active superframes without a sleep superframe. In FIG. 20B, there are seven superframes in sleep operation and thereafter only one superframe in active operation.

As described in FIG. 20A, there is defined a protocol based on exchanging beacon information in all superframes.

In FIG. 21, a pre-receive operation being defined in the process of transition from the sleep state to the active state as the hibernation operation, a communication apparatus synchronizes with the adjacent communication apparatuses in the ad-hoc network, and then transitions to the active state.

As shown in FIG. 21, active superframe 0 is set and seven superframes from the next frame are set as the hibernation duration. The communication apparatus transitions to the sleep state in superframes 1 to 7. Further, the communication apparatus temporarily transitions to the pre-receive state in superframe 7 for synchronization with the adjacent beacons.

Further, after the completion of the hibernation duration, the communication apparatus transitions to the active state in superframe 8. In general, unless otherwise specified, the active superframe is defined as only one superframe (superframe 8), thereby enabling low power consumption operation.

Furthermore, the communication apparatus transitions to the sleep state again in superframe 9 and continues the hibernation operation. That is, the communication apparatus performs the hibernation operation in eight superframes. Further, the communication apparatus is in the sleep state in seven superframes out of them and in the active state in one superframe.

FIG. 22 shows a structure in which the communication apparatus is in the active state over a plurality of superframes without the active superframe in addition to the pre-receive state limited to one. In FIG. 22, there are two active superframes; however, there may be three or more superframes.

As shown in FIG. 22, active superframe 0 is set and six superframes from the next frame are set as the hibernation duration. The communication apparatus transitions to the sleep state in superframes 1 to 6. Further, the communication apparatus temporarily transitions to the pre-receive state in superframe 6 for synchronization with the adjacent beacons.

In this case, if a plurality of active superframes are prepared sufficiently, it may be structured such that the communication apparatus does not necessarily transition to the pre-receive state.

Further, after the completion of the hibernation duration, the communication apparatus transitions to the active state in superframe 7. Furthermore, since two superframes are set to the active duration, the communication apparatus continues to be in the active state in two superframes 7 and 8.

Furthermore, the communication apparatus transitions to the sleep state again in superframe 9 and continues the repeated hibernation operation. That is, the communication apparatus performs the hibernation operation in eight superframes. Further, the communication apparatus is in the sleep state in six superframes out of them and in the active state in two superframes.

Figure 23:
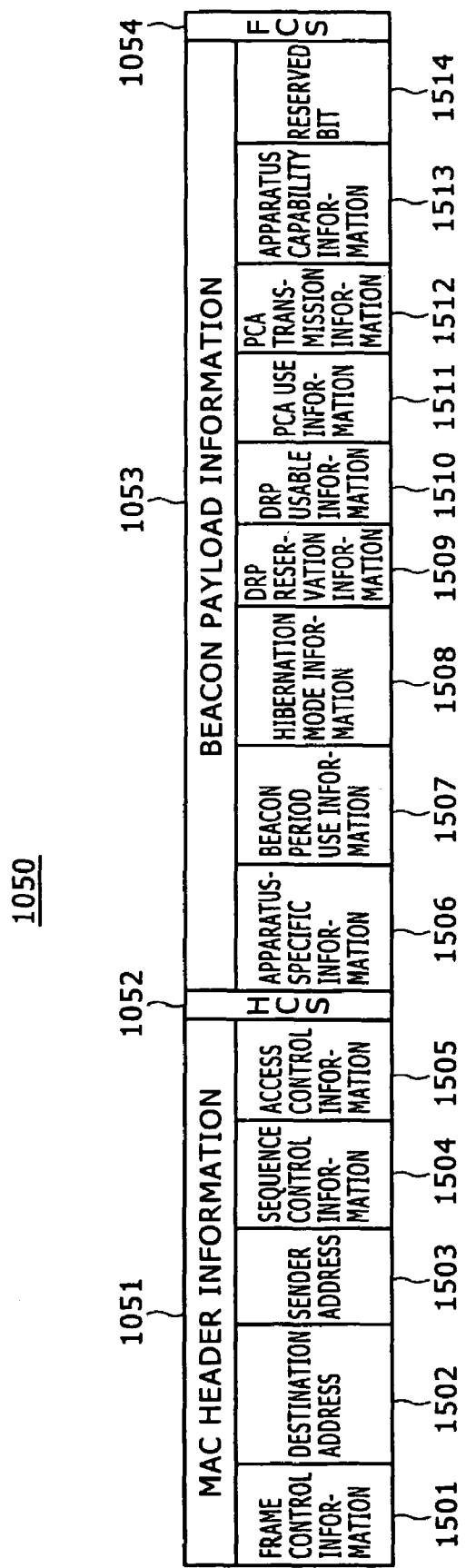
FIG. 23 is an explanatory view exemplifying the frame structure of a beacon signal according to a third embodiment.

(2) Structure Example of a Beacon Frame (FIG. 23)

FIG. 23 exemplifies the structure of a beacon frame. Each communication apparatus transmits the beacon frame in the beacon period which is the management area in the superframe. By receiving the beacon frame, parameters are exchanged between the adjacent communication apparatuses.

As shown in FIG. 23, a beacon frame 1050 according to this embodiment is structured of MAC header information 1051, a header check sequence (HCS) 1052, beacon payload information 1053, and a frame check sequence (FCS) 1054.

The MAC header information 1051 is structured of frame control information 1501, a destination address 1502 which identifies a destination communication apparatus, a sender address 1503 which identifies a sender communication apparatus, sequence control information 1504 such as a sequence number, and access control information 1505 in which a parameter necessary for access control is described.

The beacon payload information 1053 is structured of apparatus-specific information 1506 which is a parameter specific to the communication apparatus, beacon period use information 1507 which indicates the use of a beacon slot, hibernation mode information 1508 which is added in the case of the hibernation mode operation, DRP reservation information 1509 which announces a MAS position by a DRP reservation, DRP usable information 1510 which indicates a MAS position usable for a DRP reservation, PCA use information 1511 which indicates a MAS position having a possibility of being used in PCA communication, PCA transmission information 1512 which indicates the presence of transmission data in a destination communication apparatus, apparatus capability information 1513 which indicates the capacity of the communication apparatus, a reserved bit 1514, and the like.

The beacon period use information element 1507 is used to specify which beacon slot is used in the beacon period (FIG. 12). Since the structure of the beacon period use information 1507 is as described in the second embodiment with reference to FIG. 15, a description thereof is omitted.

Further, the beacon frame may be structured such that information elements are added or deleted as necessary.

(3) Structure Example of Hibernation Mode Information

FIG. 24 exemplifies the structure of hibernation mode information. The hibernation mode information is a parameter that is added to a beacon before transition to the sleep state in the hibernation mode.

As shown in FIG. 24, the hibernation mode information element is structured of an element identifier 1071 which indicates that this information element is the hibernation mode information element, an information length 1072 of the information element, a hibernation countdown 1073 in which the number of superframes until entry into the hibernation operation is described, a hibernation sleep duration 1074 in which the number of superframes in the hibernation sleep operation is described, a hibernation active duration 1075 in which the number of superframes in the active operation after the hibernation operation according to this embodiment is described, and the like.

Figure 25:
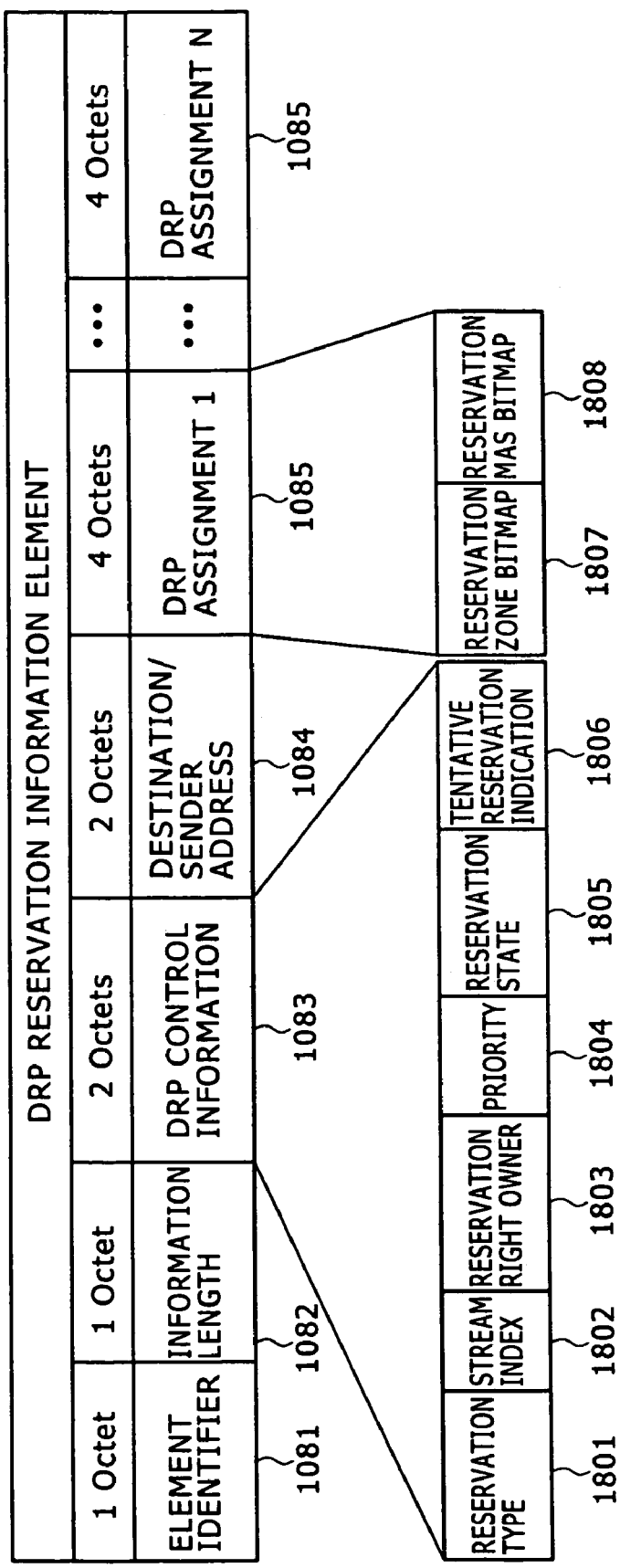
FIG. 25 is an explanatory view exemplifying the structure of DRP reservation information.

(4) Structure Example of DRP Reservation Information (FIG. 25)

FIG. 25 exemplifies the structure of DRP reservation information. The DRP reservation information is used to show a MAS reserved for each connection to the opposite communication apparatus or other adjacent communication apparatuses.

As shown in FIG. 25, the DRP reservation information includes an element identifier 1081 which indicates that this information element is the DRP reservation information, an information length 1082 of the information element, DRP control information 1083 in which the parameter of the DRP reservation is described, and a destination/sender address 1084 which specifies communication apparatuses for the DRP reservation. The DRP reservation information, as necessary, further includes parameters such as DRP assignment (1 to N) 1085 which specifies the reserved MAS.

The DRP control information 1083 is structured of a reservation type 1801 which indicates a type of the DRP reservation, a stream index 1802 which specifies a DRP reservation, a reservation right owner 1803 which indicates ownership of the reservation, a priority 1804 which indicates a reservation priority, a reservation state 1805 which indicates the current reservation state, a tentative reservation indication 1806 which performs a DRP reservation without the MAS fixed at the time of setting a reservation, and the like.

Further, the DRP assignment (1 to N) 1085 is structured of a reservation zone bitmap 1807 which indicates a DRP reservation zone (large arrangements of 16 MAS each), a reservation MAS bitmap 1808 which indicates the MAS in the zone, and the like.

Figure 26:
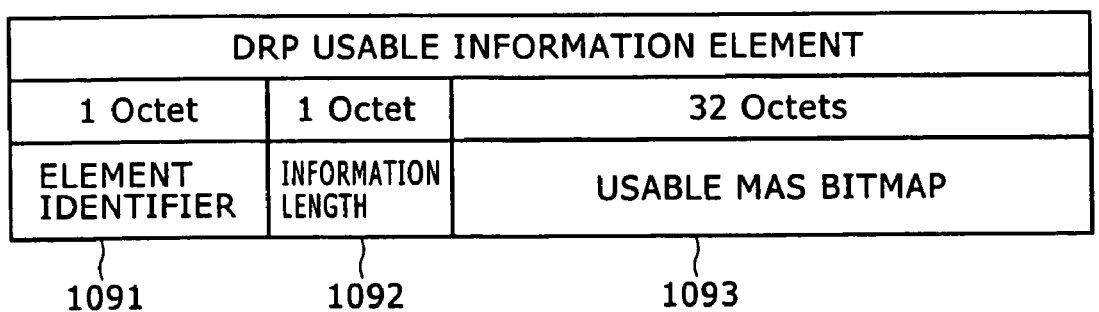
FIG. 26 is an explanatory view exemplifying the structure of DRP usable information.

(5) Structure Example of DRP Usable Information (FIG. 26)

FIG. 26 exemplifies the structure of DRP usable information. The DRP usable information is used to show a MAS that can be set for DRP reservation in the communication apparatus due to no settings of use by the adjacent communication apparatuses.

As shown in FIG. 26, the DRP usable information is structured of an element identifier 1091 which indicates that this information element is the DRP usable information, an information length 1092 of the information element, and a usable MAS bitmap 1093 which indicates a usable MAS in bitmap format.

Figure 27:
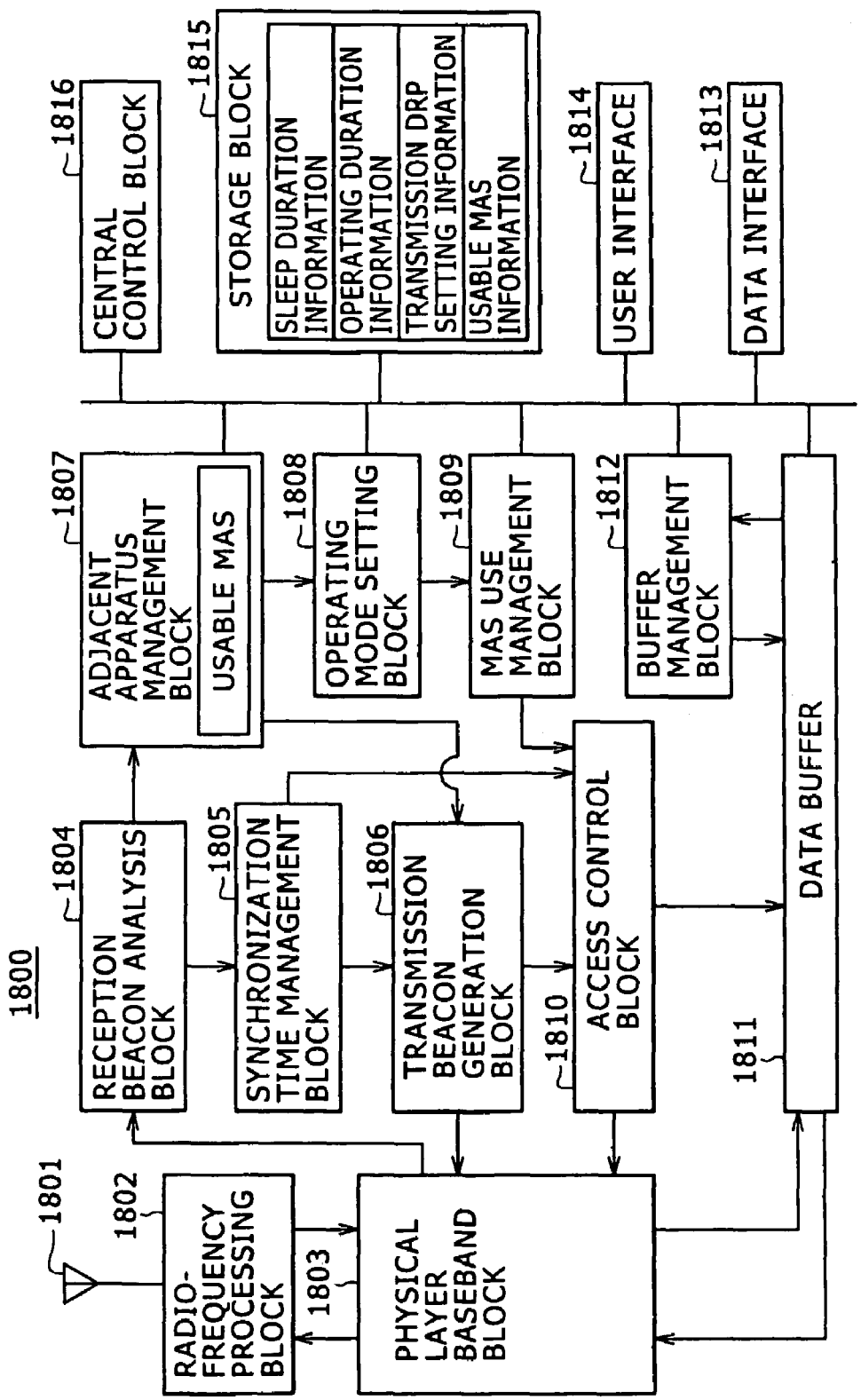
FIG. 27 is a block diagram of a wireless communication apparatus according to a third embodiment.

(6) Block Diagram of the Wireless Communication Apparatus (FIG. 27)

FIG. 27 is a block diagram of the wireless communication apparatus according to this embodiment. As shown in FIG. 27, a wireless communication apparatus 1800 according to this embodiment includes an antenna 1801 which transmits/receives a specified radio-frequency signal to/from a wireless medium, a radio-frequency processing block 1802 which amplifies the received radio-frequency signal to convert it to a reception signal and amplifies a transmission signal to convert it to a radio-frequency signal, and a physical layer baseband block 1803 which performs predetermined decoding on a desired reception signal to create information bits and encodes information bits to be transmitted into a transmission signal. The baseband block 1803 includes a CCA detector, a synchronization detector, and a header information detector, and each of them is used for access control.

The wireless communication apparatus 1800 further includes a beacon signal analysis block 1804 which analyzes beacons of the adjacent communication apparatuses, a synchronization time management block 1805 which adjusts the start position of a superframe based on a reception time drift of beacon signals from the adjacent communication apparatuses and specifies the start timing of the own transmission beacon slot, a transmission beacon generation block 1806 which generates a transmission beacon for announcing the own parameter, and an adjacent apparatus management block 1807 which stores parameters such as information described in a collected beacon and MAS information that the communication apparatus can use.

The wireless communication apparatus 1800 further includes an operating mode setting block 1808 which manages the operating mode of each superframe in this communication apparatus in order to perform the hibernation mode according to this embodiment, a MAS use management block 1809 which manages the use setting in MAS units in a superframe, and an access control block 1810 which performs predetermined access control in the MAS.

The wireless communication apparatus 1800 further includes a data buffer 1811 which temporarily stores transmission data and received data, a buffer management block 1812 which manages the storage position, and a data interface 1813 which receives transmission data from an application device connected to the wireless communication apparatus 1800 and passes received data to an application device.

The wireless communication apparatus 1800 further includes a user interface 1814 which indicates the operating status of the wireless communication apparatus 1800 to users and receives necessary instructions from users, a storage block 1815 which stores parameters such as sleep duration information of the sleep superframe, operating duration information of the active superframe, transmission DRP setting information, and usable MAS information, as a series of operations of the wireless communication apparatus 1800 and the hibernation operation according to this embodiment, and a central control block 1816 which performs the centralized management of the operation of the communication apparatus 1800.

Figure 28:
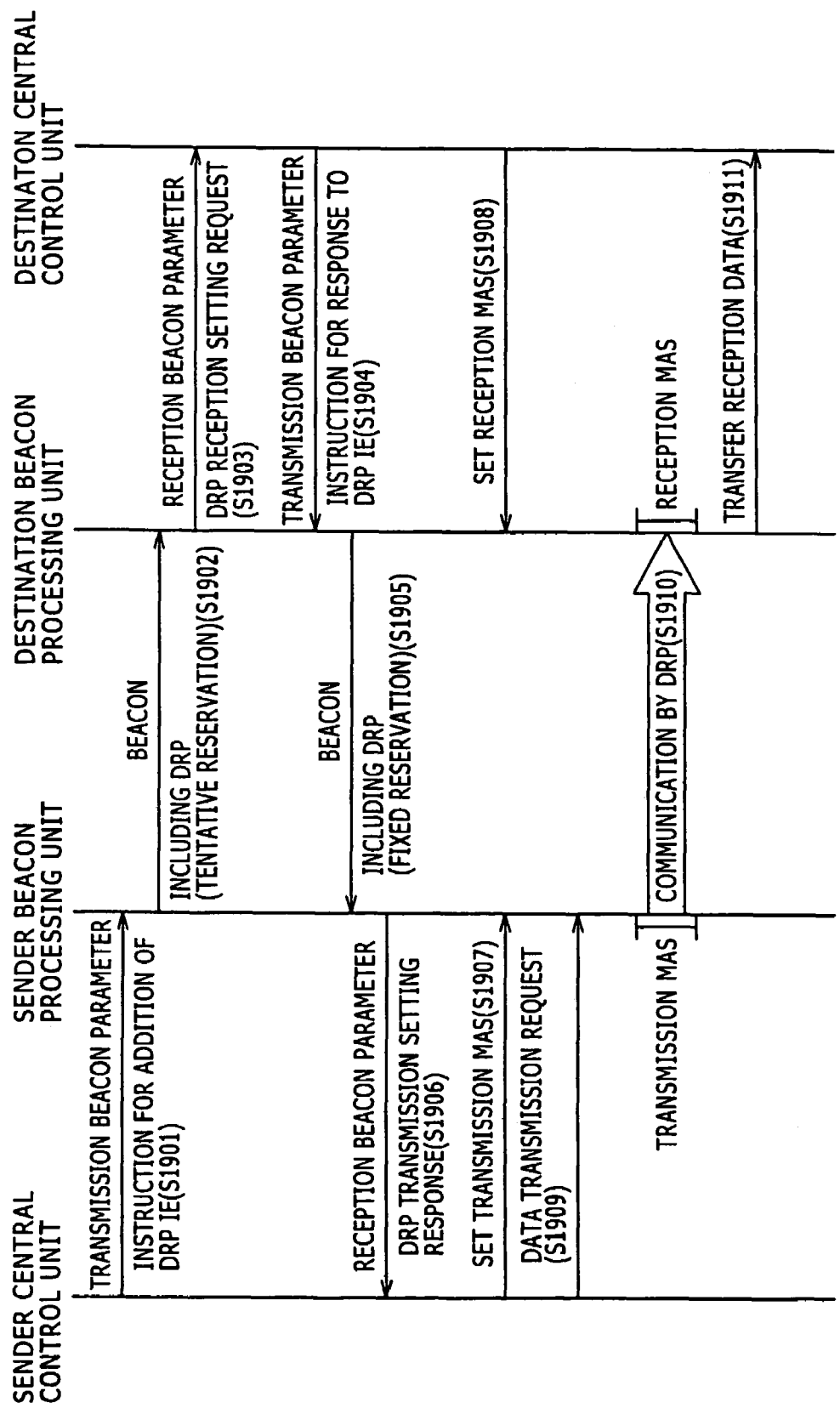
FIG. 28 is an explanatory view showing the setting sequence of DRP communication.

(7) Setting Sequence of DRP Communication (FIG. 28)

FIG. 28 shows the setting sequence of DRP communication. Further, FIG. 28 shows information exchanges between the central control units and the beacon processing units in a sender communication apparatus and a destination communication apparatus.

First, data is delivered to the data buffer of the sender communication apparatus from a device connected through the data interface. If the central control block in the sender communication apparatus determines that a DPR reservation is necessary for data transmission, the central control block sets DRP_1E in a transmission beacon to instruct tentative reservation setting to the destination communication apparatus and other adjacent communication apparatuses as a transmission beacon parameter (S1901).

Next, the beacon generation block in the sender communication apparatus specifies the opposite communication apparatus, performs DRP setting (a tentative reservation) for the corresponding communication using a usable MAS, and transmits a beacon in which the DRP setting is described (S1902).

Further, the beacon analysis block in the destination communication apparatus that has received the beacon informs the central control block about a reception beacon parameter such as MAS information that is set at the time of the DRP reservation request (S1903).

Further, the central control block that has received the DRP setting request instructs the beacon processing unit to set a transmission beacon parameter responding thereto as a response to DRP_1E (S1904).

Furthermore, the beacon processing unit transmits a beacon including DRP_1E which fixes the requested DRP reservation in the beacon slot of the next superframe (S1905).

Furthermore, the beacon analysis block in the sender communication apparatus that has received the beacon informs the central control block about a reception beacon parameter such as information responding to the DRP reservation request (S1906).

The sender communication apparatus sets a DRP transmission MAS position designated by the own transmission DRP_1E in the MAS use management block and the access control block, after the respective communication apparatuses exchange the beacons with each other during the beacon period (S1907).

Further, the destination communication apparatus sets a DRP reception MAS position designated by the own reception DRP_1E in the MAS use management block and the access control block, after the respective communication apparatuses exchange the beacons with each other during the beacon period (S1908).

Afterward, when the MAS position has come, the data buffer in the sender communication apparatus transmits the physical layer baseband block (S1909).

Further, the sender communication apparatus performs data transmission to the destination communication apparatus by DRP communication at the MAS position in synchronization with each other (S1910).

Furthermore, the data is received by the physical layer baseband block in the destination communication apparatus, stored in the data buffer, and delivered to a device connected through the data interface (S1911).

Figure 29:
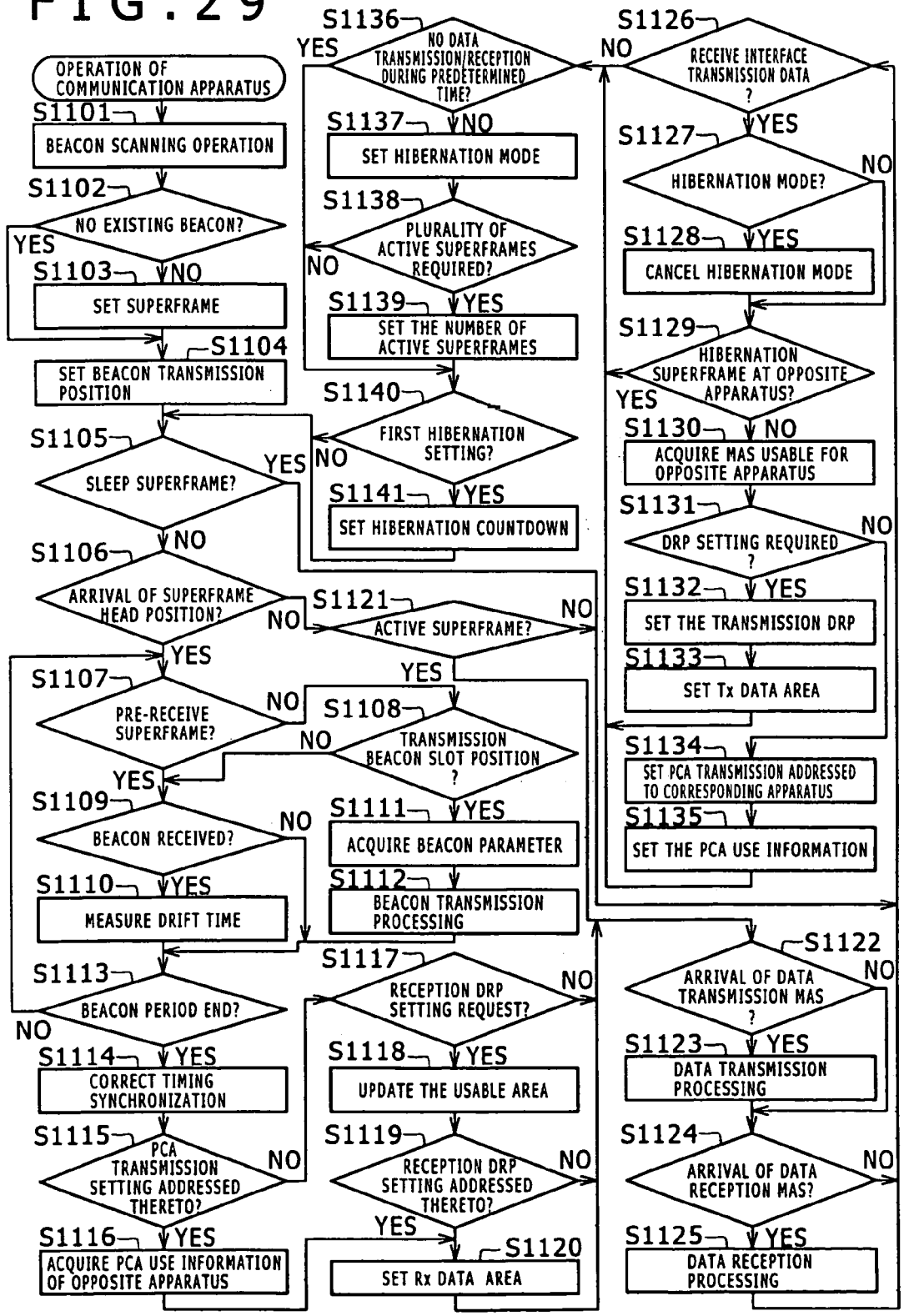
FIG. 29 is a flowchart showing the operation of a wireless communication apparatus according to a third embodiment.

(8) Operation Sequence of the Wireless Communication Apparatus (FIG. 29)

FIG. 29 shows the operation sequence of the wireless communication apparatus according to this embodiment.

First, the wireless communication apparatus performs scanning operation over the superframe period after power-on (step S1101). If the wireless communication apparatus cannot detect an existing beacon (S1102), the wireless communication apparatus itself performs a first superframe setting (S1103). Afterward, the wireless communication apparatus sets the position of the first unoccupied beacon slot among the adjacent communication apparatuses in the own beacon slot to perform beacon transmission setting (S1104).

Further, if the superframe is a sleep superframe in the hibernation according to this embodiment (S1105), the process moves to S1126. If the superframe is not a sleep superframe and the head position of the superframe has come (S1106), the process moves to S1107. If the superframe is a pre-receive superframe (S1107) or the position is not a transmission beacon slot position, the wireless communication apparatus receives beacons. If the wireless communication apparatus has received beacons (S1109), the wireless communication apparatus measures the time drifts between the times that the wireless communication apparatus recognizes and the times that the opposite communication apparatuses recognize, based on the reception timings (S1110).

If the superframe is not a pre-receive superframe but is an active superframe and the position is a transmission beacon slot position, the wireless communication apparatus acquires a transmission beacon parameter from the storage block (S1111) and transmits a beacon at a predetermined timing (S1112).

The beacon transmission/reception processing is repeated until the end of the beacon period (S1113).

After the completion of the beacon period, the wireless communication apparatus performs processing for synchronization with a communication apparatus that has transmitted a beacon at the latest timing based on the drift measurement result (S1114).

Further, if there is PCA transmission setting addressed thereto (S1115), the wireless communication apparatus refers to PCA use information described in a beacon of the opposite communication apparatus (S1116) and performs PCA reception setting in the MAS (S1120).

Further, if there is a reception DRP setting request (S1117), the wireless communication apparatus updates the setting of the own usable area in order to avoid the use of a MAS that is set in DRP communication (S1118). Furthermore, if there is reception DRP setting addressed thereto (S1119), the wireless communication apparatus performs DRP reception setting in the MAS (S1120).

If the position is not the head position of the superframe at S1106 and the superframe is an active superframe (S1121), the process moves to S1122. If a MAS in which data transmission is set has come (S1122), the wireless communication apparatus transmits data in accordance with a predetermined access procedure (S1123). Alternatively, if a MAS by which the wireless communication apparatus receives data has come (S1124), the wireless communication apparatus performs data reception processing (S1125).

If at S1121 the superframe is not an active superframe but is a pre-receive superframe, the wireless communication apparatus does not perform data transmission/reception and the process moves to S1126.

Further, if the wireless communication apparatus has received transmission data from the interface so that the buffer stores the data (S1126) and the wireless communication apparatus is in the hibernation mode (S1127), the wireless communication apparatus cancels the hibernation mode (S1128).

Further, if the opposite communication apparatus is in the hibernation superframe (S1129), the wireless communication apparatus temporarily puts the processing on hold. If the opposite communication apparatus is in another state (active or pre-receive state), the wireless communication apparatus acquires a MAS that the opposite communication apparatus can use (S1130). Furthermore, if DRP reservation setting is necessary (S1131), the wireless communication apparatus sets the own transmission DRP (S1132) and sets a DRP transmission MAS (S1133).

On the other hand, if DRP reservation setting is not necessary at S1131, the wireless communication apparatus sets PCA transmission addressed to the corresponding communication apparatus (S1134) and sets the own PCA use information (S1135).

If there is no data transmission/reception over a predetermined time period (S1136), the wireless communication apparatus sets the hibernation mode (S1137). Further, if a plurality of active superframes are necessary (S1138), the wireless communication apparatus sets the number of active superframes (S1139). If this is the first hibernation mode setting (S1140), the wireless communication apparatus sets the number of superframes of the countdown to the start of the hibernation operation (S1141).

Further, after the completion of the above-described settings, the process returns to S1105, and a series of steps is repeated.

Effects of the Third Embodiment

As described above, according to this embodiment, by maintaining the active state over a plurality of superframes, it becomes possible to exchange a variety of parameters between communication apparatuses in the hibernation mode, performing beacon transmission/reception.

By maintaining the active state over a plurality of superframes, it becomes possible to immediately detect the disappearance of a communication apparatus operating in the hibernation mode.

By adding a request in the case of being in the active state to a beacon and transmitting it to the opposite communication apparatus in the pre-receive state, it is possible to obtain a method for immediately completing the exchange of requests through beacons.

By calculating a necessary parameter before transitioning to the active state in the case of detecting a request addressed thereto in the received beacon information in a pre-receive superframe, it is possible to obtain a method for immediately completing the transmission of a response through a beacon.

Thus, there is an effect that it is possible to perform setting within a short time in a system using a method for exchanging parameters through beacons.

The preferred embodiments of the wireless communication system and the wireless communication apparatus according to the present invention have been described with reference to the accompanying drawings. However, the invention is not limited to these embodiments. It should be understood by those skilled in the art that various modifications, combinations, sub-combinations and alterations may occur depending on design requirements and other factors insofar as they are within the scope of the appended claims or the equivalents thereof.

The invention can be used in a wireless communication system and a wireless communication apparatus, and more particularly, in a wireless communication system and a wireless communication apparatus that are characterized in a method of returning to an active state from a sleep state in an-hoc network.

The invention claimed is:

1. A wireless communication system, comprising:
a plurality of wireless communication apparatuses forming an ad-hoc network, each wireless communication apparatus having a superframe,
wherein an operating state of each superframe of each wireless communication apparatus is determined from three operating states which are
an active state in which beacon signal transmission/reception and data transmission/reception are performed as necessary,
a sleep state in which beacon signal transmission/reception and data transmission/reception are not performed, and
a pre-receive state in which a beacon signal is received and afterward beacon signal transmission and data transmission are not performed.

2. A wireless communication apparatus connectable to an ad-hoc network, the wireless communication apparatus comprising:
a superframe,
wherein an operating state of the superframe is determined from three operating states which are
an active state in which beacon signal transmission/reception and data transmission/reception are performed as necessary,
a sleep state in which beacon signal transmission/reception and data transmission/reception are not performed, and
a pre-receive state in which a beacon signal is received and afterward beacon signal transmission and data transmission are not performed.

3. The wireless communication apparatus according to claim 2, wherein the wireless communication apparatus transitions from the sleep state to the pre-receive state in a predetermined superframe period and receives a beacon signal from an adjacent wireless communication apparatus, and at the time of transitioning to the active state according to information contained in the beacon signal, according to the beacon signal the wireless communication apparatus sets transmission timing of a beacon signal.

4. The wireless communication apparatus according to claim 3, wherein in the case where the beacon signal received in the pre-receive state contains information concerning an activation request addressed thereto, the wireless communication apparatus transitions to the active state.

5. The wireless communication apparatus according to claim 3, wherein at the time of transitioning to the active state, the wireless communication apparatus grasps a state of another wireless communication apparatus existing in an adjacent area from the beacon signal received in the pre-receive state and announces its own transmission beacon information about a transition to the active state.

6. The wireless communication apparatus according to claim 2, further comprising:
a device configured to detect the presence of a wireless communication apparatus in a low power consumption mode of transitioning from the sleep state to the pre-receive state or the active state in a predetermined superframe period, out of adjacent wireless communication apparatuses; and
a device configured to add information concerning the presence of the wireless communication apparatus in the low power consumption mode to a beacon signal.

7. The wireless communication apparatus according to claim 6, wherein in the case of changing a position of a beacon slot that the wireless communication apparatus transmits, the wireless communication apparatus receives the beacon signal to which the information concerning the presence of the wireless communication apparatus in the low power consumption mode is added and determines to use a beacon slot other than the beacon slot that the wireless communication apparatus in the low power consumption mode has used, as the beacon slot that the wireless communication apparatus transmits.

8. The wireless communication apparatus according to claim 2, wherein the wireless communication apparatus sets a low power consumption mode of transitioning periodically between the sleep state over a plurality of superframes and the active state over a plurality of superframes.

9. The wireless communication apparatus according to claim 8, wherein the wireless communication apparatus transitions to the pre-receive state at the time of transitioning from the sleep state to the active state, and at the time of having transitioned to the pre-receive state, the wireless communication apparatus receives a beacon signal and adjusts a superframe period with an adjacent wireless communication apparatus.

10. The wireless communication apparatus according to claim 9, wherein in the pre-receive state, the wireless communication apparatus receives a beacon signal from an adjacent wireless communication apparatus, and in the case of detecting a request addressed thereto in the received beacon signal, the wireless communication apparatus transmits a response to the request with a first beacon signal after a transition to the active state.

11. The wireless communication apparatus according to claim 8, wherein the wireless communication apparatus communicates with an adjacent wireless communication apparatus operating in the low power consumption mode, and in the case of detecting that the adjacent wireless communication apparatus is in the pre-receive state, the wireless communication apparatus describes a request to the adjacent wireless communication apparatus in a beacon signal and transmits the beacon signal prior to a transition to the active state.

12. A wireless communication apparatus connectable to an ad-hoc network, the wireless communication apparatus comprising:
- a superframe;
- an operating mode setting device configured to set an operating mode allowing an operating state of each superframe to transition at a predetermined period,
- wherein the operating state is determined from three operating states which are
- an active state in which beacon signal transmission/reception and data transmission/reception are performed as necessary,
- a sleep state in which beacon signal transmission/reception and data transmission/reception are not performed, and
- a pre-receive state in which a beacon signal is received and afterward beacon signal transmission and data transmission are not performed, and
- the operating mode setting device sets a low power consumption mode of transitioning from the sleep state to the pre-receive state in a predetermined superframe period.

13. A computer-readable medium storing a computer-readable program, the program being operable to implement a method for allowing a computer to function as a wireless communication apparatus connectable to an ad-hoc network, the wireless communication apparatus having a superframe, the method comprising:
- determining an operating state of each superframe of the wireless communication apparatus from three operating states which are
- an active state in which beacon signal transmission/reception and data transmission/reception are performed as necessary,
- a sleep state in which beacon signal transmission/reception and data transmission/reception are not performed, and
- a pre-receive state in which a beacon signal is received and afterward beacon signal transmission and data transmission are not performed.

14. A computer-readable medium storing a computer-readable program, the program being operable to implement a method for allowing a computer to function as a wireless communication apparatus connectable to an ad-hoc network, the wireless communication apparatus having a superframe and an operating mode setting device configured to set an operating mode allowing an operating state of the superframe to transition at a predetermined period, the method comprising:
- determining the operating state of each superframe from three operating states which are
- an active state in which beacon signal transmission/reception and data transmission/reception are performed as necessary,
- a sleep state in which beacon signal transmission/reception and data transmission/reception are not performed; and
- a pre-receive state in which a beacon signal is received and afterward beacon signal transmission and data transmission are not performed; and
- setting a low power consumption mode of transitioning from the sleep state to the pre-receive state in a predetermined superframe period.

15. A wireless communication apparatus constituting an ad-hoc network, the wireless communication apparatus comprising:
- a superframe,
- wherein the wireless communication apparatus sets a hibernation mode allowing a periodic transition of an operating state of each superframe between an active state in which beacon signal transmission/reception and data transmission/reception are performed as necessary, a sleep state in which beacon signal transmission/reception and data transmission/reception are not performed, and a pre-receive state in which a beacon signal is received and afterward beacon signal transmission and data transmission are not performed, the sleep state over a plurality of superframes, and the active state over a plurality of superframes.

16. A computer-readable medium storing a computer-readable program, the program being operable to implement a method for allowing a computer to function as a wireless communication apparatus connectable to an ad-hoc network, the method comprising:
- setting a hibernation mode allowing a periodic transition of an operating state of each superframe of the wireless communication apparatus between an active state in which beacon signal transmission/reception and data transmission/reception are performed as necessary, a sleep state in which beacon signal transmission/reception and data transmission/reception are not performed, and a pre-receive state in which a beacon signal is received and afterward beacon signal transmission and data transmission are not performed, the sleep state over a plurality of superframes, and the active state over a plurality of superframes.

* * * * *